US009007968B2

(12) United States Patent
Singh et al.

(10) Patent No.: US 9,007,968 B2
(45) Date of Patent: *Apr. 14, 2015

(54) SYSTEM AND METHOD FOR WIRELESS MULTI-BAND NETWORKS ASSOCIATION AND MAINTENANCE

(75) Inventors: Harkirat Singh, Santa Clara, CA (US); Julan Hsu, Saratoga, CA (US); Chiu Ngo, San Francisco, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 243 days.

This patent is subject to a terminal disclaimer.

(21) Appl. No.: 12/721,364

(22) Filed: Mar. 10, 2010

(65) Prior Publication Data

US 2010/0315954 A1 Dec. 16, 2010

Related U.S. Application Data

(60) Provisional application No. 61/187,588, filed on Jun. 16, 2009.

(51) Int. Cl.
*H04B 7/00* (2006.01)
*H04W 72/04* (2009.01)
(Continued)

(52) U.S. Cl.
CPC ............ *H04W 72/044* (2013.01); *H04W 76/00* (2013.01); *H04W 88/06* (2013.01)

(58) Field of Classification Search
CPC .................................................... H04W 88/06
USPC ....................... 370/310, 310.2, 328, 334, 338
See application file for complete search history.

(56) References Cited

U.S. PATENT DOCUMENTS 6,640,087 B2    10/2003  Reed et al.
7,092,368 B2 *   8/2006  Kumar et al. ................. 370/328
(Continued)

FOREIGN PATENT DOCUMENTS

CN    101714893 A    5/2010
GB      2415573 A    6/2004
(Continued)

OTHER PUBLICATIONS

Cianca et al., Location/Situation-Aware Architecture for Mobility Management over Heterogeneous Networks, Proceedings of the 2nd International Conference on Mobile Multimedia Communications, 2006, 6 pages.

(Continued)

*Primary Examiner* — Hassan Kizou
*Assistant Examiner* — Deepa Belur
(74) *Attorney, Agent, or Firm* — Sherman IP LLP; Kenneth L. Sherman; Steven Laut

(57) ABSTRACT

A system and method for wireless communication over multi-rate channels are disclosed. One embodiment of the system includes a first multi-band wireless station that is capable of using a first frequency band and a second frequency band for wireless communication; and a second multi-band wireless station that is capable of using the first frequency band and the second frequency band for wireless communication. One or more of the first and second stations is configured to monitor a status of the second frequency band. The status includes the availability of the second frequency band for communication between the first and second stations. The first and second stations can share the monitored status with each other via the first frequency band.

58 Claims, 13 Drawing Sheets

(51) Int. Cl.
*H04W 76/00* (2009.01)
*H04W 88/06* (2009.01)

(56) References Cited

U.S. PATENT DOCUMENTS

| | | | |
|---|---|---|---|
| 7,366,089 | B2 | 4/2008 | Tehrani et al. |
| 7,831,738 | B2 * | 11/2010 | Rofougaran ............... 709/250 |
| 7,986,949 | B2 | 7/2011 | Ryu et al. |
| 8,077,683 | B2 | 12/2011 | Rudolf et al. |
| 2005/0143133 | A1 | 6/2005 | Bridgelall |
| 2006/0268760 | A1 | 11/2006 | Fang et al. |
| 2007/0002876 | A1 | 1/2007 | Berkman et al. |
| 2007/0099668 | A1 | 5/2007 | Sadri et al. |
| 2007/0195721 | A1 * | 8/2007 | Backes et al. ............... 370/310 |
| 2007/0258508 | A1 | 11/2007 | Werb et al. |
| 2008/0075145 | A1 * | 3/2008 | Balachandran et al. ...... 375/132 |
| 2008/0096560 | A1 | 4/2008 | Felske et al. |
| 2008/0139212 | A1 | 6/2008 | Chen et al. |
| 2009/0232049 | A1 | 9/2009 | Singh et al. |
| 2010/0014458 | A1 | 1/2010 | Singh et al. |
| 2010/0034143 | A1 * | 2/2010 | Cordeiro et al. ............. 370/328 |
| 2010/0074190 | A1 * | 3/2010 | Cordeiro et al. ............. 370/329 |
| 2010/0265990 | A1 * | 10/2010 | Birru ............................. 375/130 |
| 2011/0038290 | A1 | 2/2011 | Gong et al. |
| 2011/0069650 | A1 * | 3/2011 | Singh et al. ................... 370/311 |
| 2011/0128901 | A1 | 6/2011 | Lee et al. |
| 2011/0205928 | A1 | 8/2011 | Pelletier et al. |
| 2014/0348081 | A1 * | 11/2014 | Liao ............................. 370/329 |

FOREIGN PATENT DOCUMENTS

| | | |
|---|---|---|
| JP | 2004128798 | 4/2004 |
| JP | 2009124463 | 4/2009 |
| KR | 1020090089373 A | 8/2009 |
| WO | 2009062116 A1 | 5/2009 |
| WO | 2010036595 A2 | 1/2010 |

OTHER PUBLICATIONS

Courville et al, "Evaluation of centralized adhoc network architecture (CANA)," BAI cluster workshop 2004-03, IST BroadWay project, Jun. 1, 2004, 17 pages.

Draves et al., "Routing in multi-radio, multi-hop wireless mesh networks," 15 pages, MobiCom '04, Sep. 26-Oct. 1, 2004.

Heinzelman et al., "Energy efficient communication protocol for wireless microsensor networks," Proc. The 33rd Hawaii International Conference on System Science, Hawaii, U.S.A., Jan. 2000, pp. 1-10.

Iannone et al., "Can multi-rate radios reduce end-to-end delay in mesh networks? A simulation case study," Mesh Networking: Realizing the Wireless Internet (Meshnets), Jul. 2005, pp. 1-10.

IEEE 802.11 Standard for Information technology—Telecommunications and information exchange between systems—Local and metropolitan area networks—Specific requirements. Part 11: Wireless LAN Medium Access Control (MAC) and Physical Layer (PHY) specification, IEEE Computer Society, pp. 87-140, 146-148, 456-461, (Jun. 12, 2007).

IEEE 802.11, Standard for Information Technology—Telecommunications and Information Exchange between Systems—Local and Metropolitan Area Networks—Specific requirements Part 11: Wireless LAN Medium Access Control (MAC) and Physical Layer (PHY) Specifications—2007 (Revision of IEEE Std 802.11-1999), IEEE Computer Society, 1232 pages, (Jun. 12, 2007).

IEEE P802.11nTM/ D3.00, Draft Standard for information technology—Telecommunications and information exchange between systems—Local and metropolitan area networks—Specific requirements—Part 11: Wireless LAN Medium Access Control (MAC) and Physical Layer (PHY) specifications: Amendment 4: Enhancements for Higher Throughput, IEEE, Sep. 2007, pp. 1-544.

IEEE P802.11nTM/ D3.00, Draft Standard for information technology—Telecommunications and information exchange between systems—Local and metropolitan area networks—Specific requirements—Part 11: Wireless LAN Medium Access Control (MAC) and Physical Layer (PHY) specifications: Amendment 8: Medium Access Control (MAC) Quality of Service Enhancements IEEE, 2005, pp. 1-211.

IEEE P802.11zTM/ D1.0, Draft Standard for information technology—Telecommunications and information exchange between systems—Local and metropolitan area networks—Specific requirements—Part 11: Wireless LAN Medium Access Control (MAC) and Physical Layer (PHY) specifications: Amendment 7: Direct Link Setup, IEEE, Mar. 2008, pp. 1-36.

IST Broadway, "A 5/60GHz hybrid system concept", 12 pages; available at www.ist-browadway.org/documents/broadway-broadband_air_interfaces_cluster.pdf (last visited on Apr. 24, 2008).

Madhow, "MultiGigabit millimeter wave communication: System concepts and challenges," Department of Electrical and Computer Engineering, UCSB, Workshop Jan./Feb. 2008, pp. 193-196.

Poroor et al., Fast Dual-Radio Cross-Layer Handoffs in Multi-Hop Infrastructure—mode 802.11 Wireless Networks for In-Vehicle Multimedia Infotainment, IEEE ANTS 2008, 3 pages.

Ramachandran et al., "Interference-aware channel assignment in multi-radio wireless mesh networks," Infocom 2006.

Ros et al., "Cluster-based OLSR extensions to reduce control overhead in mobile Ad hoc networks," International wireless Communications and Mobile Computing Conference (IWCMC 2007) Department of Information and Communications Engineering, University of Murcia, pp. 202-207, Aug. 12-16, 2007, Honolulu, Hawaii, U.S.A.

Vaios et al., Increasing Capacity in Dual-Band WLANS Through AD-HOC Networking, University of Athens, Department of Informatics & Telecommunications, International Journal of Wireless and Mobile Computing (IJWMC), Special Issue on Wireless Ad Hoc. Networking, 2005, 13 pages.

Villasenor-Gonzalez et al., "HOLSR: A hierarchical proactive routing mechanism for mobile Ad hoc networks," IEEE Communications Magazine (Jul. 2005).

U.S. Non-Final Office Action for U.S. Appl. No. 12/482,328 mailed Jan. 25, 2012.

Notification of Transmittal of the International Search Authority, International Search Report and Written Opinion dated May 19, 2011 for International Application No. PCT/KR2010/006497 from Korean Intellectual Property Office, pp. 1-9, Seo-gu, Daejeon, Republic of Korea.

European Search Report dated Jul. 3, 2012 for European Application No. 10817474.9 from European Patent Office, pp. 1-7, The Hague, Rijswijk, The Netherlands.

U.S. Notice of Allowance for U.S. Appl. No. 12/721,340 mailed Nov. 14, 2012.

Examination Report dated Jun. 25, 2013 for Australian Application No. 2010296116 from Australian Government IP Australia Office, pp. 1-2, Phillip ACT, Australia.

Decision on Patent Grant dated Jun. 3, 2013 for Russian Application No. 2012116129/07 from Federal Service for Intellectual Property (Rospatent), pp. 1-20, Moscow, Russia (English-language translation pp. 1-9).

Australian Notice of Acceptance mailed Jan. 31, 2014 for Australian Application No. 2010296116 from Australian Government, IP Australia, pp. 1-2, Woden ACT, Australia.

Japanese Office Action dated Apr. 22, 2014 for Japanese Patent Application No. 2012530782 from Japan Patent Office, pp. 1-3, Tokyo, Japan (Machine-generated English-language translation, pp. 2-3).

Chinese Office Action dated Jun. 3, 2014 for Chinese Patent Application No. 201080052659.1 from State Intellectual Property Office of the P.R.C, pp. 1-10, Bejing, China (Machine-generated English-language translation, pp. 8-10).

U.S. Notice of Allowance for U.S. Appl. No. 12/482,328 mailed May 2, 2012.

U.S. Non-Final Office Action for U.S. Appl. No. 12/271,340 mailed Jul. 10, 2012.

\* cited by examiner

SYSTEM AND METHOD FOR WIRELESS MULTI-BAND NETWORKS ASSOCIATION AND MAINTENANCE

RELATED APPLICATION

This application claims priority from U.S. Provisional Patent Application No. 61/187,588, filed on Jun. 16, 2009, which is incorporated herein by reference. This application is related to U.S. patent application Ser. No. 12/721,340, entitled "SYSTEM AND METHOD FOR POWER SAVING BY COORDINATED WAKE-UP IN A WIRELESS MULTI-BAND NETWORK", (filed on even date herewith), the disclosure of which is incorporated by reference in its entirety.

BACKGROUND OF THE INVENTION

1. Field of the Invention

The present invention relates to a wireless network, and in particular, to a wireless network having multiple channels.

2. Description of the Related Technology

Wireless networks typically include a plurality of wireless stations. Such wireless stations can communicate with each other on a wireless channel having a selected frequency.

Certain wireless stations can use multiple channels for transmission and/or reception of signals. For example, a wireless station can use a high-rate channel (for example, 60 GHz channel) and a low-rate channel (2.4/5 GHz channel). Such a wireless station can use either or both of the channels, depending on the needs.

It is often desirable to use a higher frequency channel among the multiple channels to have a higher transmission rate. However, such a higher frequency channel may not be always available for transmission between two wireless stations at a given time. Thus, there is a need for managing the use of the multiple channels to optimize wireless transmissions between the wireless stations.

SUMMARY OF CERTAIN INVENTIVE ASPECTS

In one embodiment, there is a device for wireless communication. The device comprises: a first antenna system configured to use a first frequency band for wireless communication; and a second antenna system configured to use a second frequency band for wireless communication. The second frequency band is different from the first frequency band. The device further comprises a memory configured to store multi-band information comprising a status of the second frequency band; and a medium access control (MAC) layer configured to monitor the status of the second frequency band, and to transmit and/or receive a signal via a pre-established wireless link on the first frequency band, the signal including at least part of the multi-band information.

In another embodiment, there is a wireless communication system. The system comprises: a first multi-band wireless station that is capable of using a first frequency band and a second frequency band for wireless communication. The second frequency band is different from the first frequency band. The system also includes a second multi-band wireless station that is capable of using the first frequency band and the second frequency band for wireless communication. One or more of the first and second stations is configured to store multi-band information comprising a status of the second frequency band. One or more of the first and second stations is further configured to monitor the status of the second frequency band. The status comprises availability of the second frequency band for communication between the first and second stations. The first and second stations share the monitored status with each other via the first frequency band.

In yet another embodiment, there is a method of wireless communication. The method comprises: establishing, by a first multi-band wireless station capable of using first and second frequency bands for wireless communication, a wireless link on the first frequency band with a second multi-band wireless station capable of using the first and second frequency bands for wireless communication. The second frequency band is different from the first frequency band. The method also includes monitoring, by the first station, a status of the second frequency band; and transmitting, by the first station, an information element containing the status of the second frequency band to the second station via the first frequency band.

In yet another embodiment, there is a method of wireless communication. The method comprises: establishing, by a first multi-band wireless station capable of using first and second frequency bands for wireless communication, a wireless link on the first frequency band with a second multi-band wireless station capable of using the first and second frequency bands for wireless communication. The second frequency band is different from the first frequency band. The method also includes receiving, by the first station, a signal including information on a status of the second frequency band from the second station via the wireless link on the first frequency band; and determining, by the first station, whether the second frequency band is available for communication between the first and second stations.

DETAILED DESCRIPTION OF CERTAIN INVENTIVE EMBODIMENTS

Figure 1:
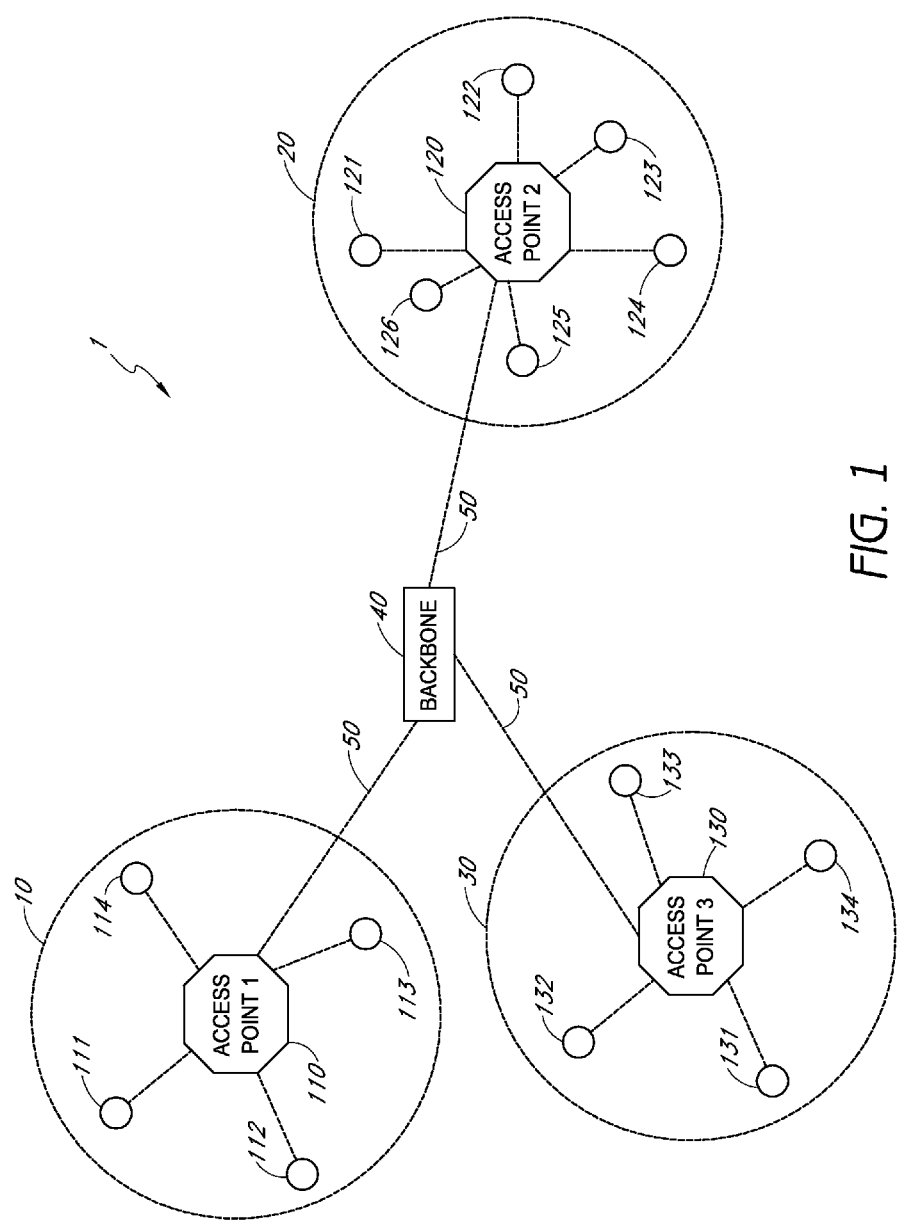
FIG. 1 is a block diagram illustrating an example wireless network including a plurality of sub-networks.

The following detailed description of certain embodiments presents various descriptions of specific embodiments of the invention. However, the invention can be embodied in a multitude of different ways as defined and covered by the claims. In this description, reference is made to the drawings where like reference numerals indicate identical or functionally similar elements.

The terminology used in the description presented herein is not intended to be interpreted in any limited or restrictive manner, simply because it is being utilized in conjunction with a detailed description of certain specific embodiments of the invention. Furthermore, embodiments of the invention may include several novel features, no single one of which is solely responsible for its desirable attributes or which is essential to practicing the inventions herein described. Various processors, memories, computer readable media and programs can be used to implement the invention.

Overview of Wireless Network

Referring to FIG. 1, an example wireless network will be described below. The wireless network 1 includes a plurality of sub-networks 10, 20, 30 and a network backbone 40. The illustrated portion of the network 1 includes three sub-networks, but a skilled technologist will appreciate that the network can include more or less sub-networks.

Each of the sub-networks 10, 20, 30 includes an access point 110, 120, 130 and one or more wireless stations or devices 111-114, 121-126, 131-134. Each of the access points 110-130 is capable of performing wireless communication with the one or more wireless stations within the sub-network according to a wireless communication protocol. The access points 110-130 are also connected to the network backbone 40 via wired or wireless channels 50. Each of the access points 110-130 may provide communication between stations within its respective sub-network 10-30 or between a station in its sub-network and another station in another sub-network. A network including such an access point can be referred to as an infrastructure network. In the context of this document, an access point and non-access point stations in communication with the access point can be collectively referred to as a basic service set.

The one or more wireless stations 111-114, 121-126, 131-134 are located within a coverage region within which the access point can communicate wirelessly. The one or more stations 111-114, 121-126, 131-134 can be electronic devices that can wirelessly connect to one or more of the access points 110, 120, 130. Examples of such electronic devices include, but are not limited to, a mobile phone, a smart phone, a telephone, a television, a set-top box, a computer monitor, a computer, a hand-held computer, an electronic book device, a personal digital assistant (PDA), a microwave, a refrigerator, a stereo system, a cassette recorder or player, a DVD player or recorder, a CD player or recorder, a VCR, a digital video recorder (DVR), an MP3 player, a radio, a camcorder, a camera, a digital camera, a portable memory chip, a washer, a dryer, a washer/dryer, a copier, a facsimile machine, a scanner, a multi functional peripheral device, a wrist watch, a clock, a game device, etc. In certain arrangements, one or more stations can belong to two or more sub-networks. In certain embodiments, at least one of the access points 110, 120, 130 may be part of such an electronic device.

The network backbone 40 serves to interconnect the sub-networks 10, 20, 30 to one another, providing a path for the exchange of information between them. The network backbone 40 can be connected to another backbone for communication with another network.

In one embodiment, the sub-networks 110-130 may be in compliance with the same communication protocol. In other embodiments, one of the sub-networks 110-130 may comply with a communication protocol different from the protocols of the other sub-networks. In some embodiments, the sub-networks 110-130 can use different frequency bands from one another. In certain arrangements, the access points and the stations may be in compliance with the IEEE 802.11 standard. In one embodiment, the network 1 can form a wide area network (WAN), and each of the sub-networks 10-30 can form a local area network (LAN). In another embodiment, the network 1 can form a local area network (LAN). In certain embodiments, at least one of the sub-networks 110-130 may form an ad-hoc network without an access point.

Wireless Networks Employing Multi-Rate Channels

In some embodiments, a wireless station or device can use multiple channels for transmission and/or reception of data or control signals. Such a wireless station or device can be referred to as a multi-band station or device in the context of this document. In this document, the term "channel" can be interchangeably used with "band," "frequency band," or "frequency." For example, the multiple channels can include two or more channels, including, but not limited to, 2.4/5 GHz (for example, in current WiFi), 60 GHz, Bluetooth band (2.4 GHz), and Terahertz.

In one embodiment, a wireless station can use two channels: a high-rate channel (HRC) and a low-rate channel (LRC) for transmission and/or reception. The term "high-rate channel" can be interchangeably used with "high frequency channel," "high frequency band," "high-rate band," or "high band" in this document. The term "low-rate channel" can be interchangeably used with "low frequency channel," "low frequency band," "low-rate band," or "low band" in this document.

The high-rate channel has a shorter range than the low-rate channel. The high-rate channel may be directional whereas the low-rate channel may be directional or omni-directional. In certain embodiments, the low rate channel may be omni-directional as a default, and optionally directional. The channels can be established to be directional or omni-directional by using different antenna systems. In the context of this document, the terms "directional channel" and "omni-directional channel" can be interchangeably used with "directional transmission/reception capability" and "omni-directional transmission/reception capability," respectively.

In one embodiment, the high-rate channel may have a frequency from about 6 GHz to about 300 GHz. Such a frequency may include an extremely high frequency (EHF). The high-rate channel may be a 60 GHz channel that is supported by 60 GHz millimeter-wave radio. In one embodiment, the communication range of a 60 GHz channel for an indoor environment may be of the order of 10 meters. In other embodiments, the high-rate channel can use a terahertz frequency ranging between 300 GHz and 3 THz. In one embodiment, either the high-rate channel or the low-rate channel is active at a given time instance.

The low-rate channel may be a channel having a frequency below 6 GHz. In one embodiment, the low-rate channel can be a 2.4 GHz or 5 GHz channel that can support Wireless Local Area Network (WLAN). The interface for the low-rate channel may be in compliance with IEEE 802.11. In one embodiment, the low-rate channel for an indoor environment that has a frequency lower than 6 GHz can have a range of about 20 meters to about 100 meters.

Figure 2:
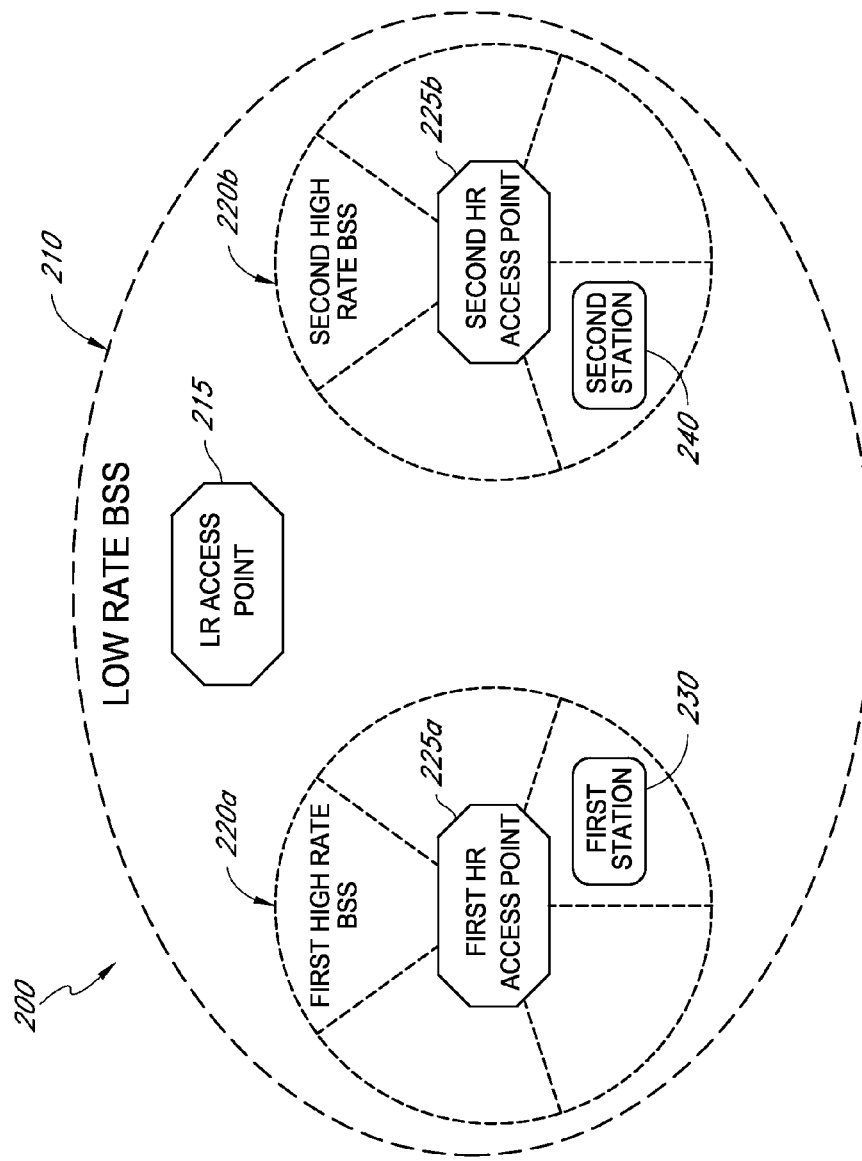
FIG. 2 is a block diagram of a wireless network including a low-rate basic service set and high-rate basic service sets according to one embodiment.

In some embodiments, a multi-band station can be part of multiple infrastructure networks that use channels of different frequencies. Referring to FIG. 2, one embodiment of such multiple infrastructure networks will be described below. The illustrated wireless system 200 includes a low-rate (LR) infrastructure network 210, a first high-rate (HR) infrastructure network 220a, and a second high-rate (HR) infrastructure network 220b.

The LR network 210 overlaps with the first HR network 220a and the second HR network 220b. Because the LR network 210 uses a lower rate channel than the HR networks 220a, 220b in data or control signal transmissions, the LR network 210 has a greater coverage than the HR networks 220a, 220b. The first and second HR networks 220a, 220b do not overlap with each other due to a distance between them. The LR network 210 can include a low-rate (LR) access point 215. The first and second HR networks 220a, 220b can include first and second high-rate (HR) access points, respectively. The first HR access point 225a may also be referred to as a first personal basic service set (PBSS) control point (PCP) in the context of this document. The second HR access point 225b may also be referred to as a second personal basic service set (PBSS) control point (PCP) in the context of this document.

The system 200 can also include a first multi-band station 230 and a second multi-band station 240. In the illustrated instance, the first multi-band station 230 is associated with the low-rate access point 215, and thus is part of the LR network 210 when using a low-rate channel. The first multi-band station 230 is also associated with the first high-rate access point 225a, and thus is part of the first HR network 220a when using a high-rate channel. The second multi-band station 240 is also associated with the low-rate access point 215, and thus is part of the LR network 210 when using the low-rate channel. The second multi-band station 240 is also associated with the second high-rate access point 225b, and thus is part of the second HR network 220b when using the high-rate channel.

In the embodiment shown in FIG. 2, the LR network 210 that includes devices using the low-rate channel (for example, the LR access point 215, the first station 230, and the second station 240) can be referred to as a low-rate basic service set (LRBSS). The first HR network 220a that includes devices using the high-rate channel (for example, the first HR access point 225a and the first station 230) can be referred to as a first high-rate basic service set (HRBSS1). The second HR network 220b that includes devices using the same high-rate channel as the first high-rate network 220a (for example, the second HR access point 225b and the second station 240) can be referred to as a second high-rate basic service set (HRBSS2).

During operation, the LR access point 215 can communicate with either or both of the first and second stations 230, 240 via the low-rate channel. In one embodiment, the first and second stations 230, 240 can start communication with the LR access point 215 by performing an association process. In certain embodiments, the low-rate access point 215 can transmit low-rate beacon signals periodically to inform a transmission schedule that can be used by devices within the network 210.

In the context of this document, the term "association" can refer to a process to establish a link between an access point and a non-access point station or between non-access point stations. In one embodiment, the association process allows a non-access point station to join in a network. The association process can include exchange of an association request and an association response between an access point and a non-access point station. The association process can also include authentication of devices involved in the process. In certain embodiments, an association process for the high-rate channel can include beamforming for directional transmission. In other embodiments, the association process can refer to a process for establishing a link between two non-access point stations, which can involve exchange of control frames, beamforming, and/or authentication.

The first and second stations 230, 240 can communicate with each other on the low-rate channel via the LR access point 215. In another embodiment, the first and second stations 230, 240 can communicate directly with each other on the low-rate channel via a direct link without using the LR access point 215.

In some embodiments, the first HR access point 225a can transmit first beacon signals periodically to inform a transmission schedule that can be used by devices within its network 220a. The first beacon signals are transmitted over the high-rate channel, and can be directional. The first beacon signals can also be used by devices to determine whether the devices are within the coverage of the first HR network 220a. If it is determined that the devices are within the coverage of the first HR network 220a, such devices can start communication with the first HR access point 225a by performing an association process. Devices that have been associated with the first HR access point 225a can communicate with each other on the high-rate channel, either via the first HR access point 225a or directly.

Similarly, the second HR access point 225b can transmit second beacon signals periodically to inform a transmission schedule that can be used by devices within its network 220b. The second beacon signals are transmitted over the high-rate channel, and can be directional. The second beacon signals can include different information from the first beacon signals, and can be used by devices to determine whether the devices are within the coverage of the second HR network 220b. If it is determined that the devices are within the coverage of the second HR network 220b, such devices can start communication with the second HR access point 225b by performing an association process. Devices that have been associated with the second HR access point 225b can communicate with each other on the high-rate channel, either via the second HR access point 225b or directly.

In the illustrated example, the first station 230 is within the coverage of the first HR basic service set 220a, and is associated with the first HR access point 225a. The second station 240 is within the coverage of the second HR basic service set 220b, and is associated with the second HR access point 225b. In certain embodiments, the multi-band stations 230, 240 may operate in a distributed mode without being associated with the first or second HR access points 225a, 225b.

In the illustrated example, the first and second stations 230, 240 can communicate with each other over the low-rate channel, but not over the high-rate channel due to a distance between them. However, when either or both of the first and second stations 230, 240 are relocated close enough to each other to allow communication over the high-rate channel, they can also communicate over the high-rate channel.

Figure 3:
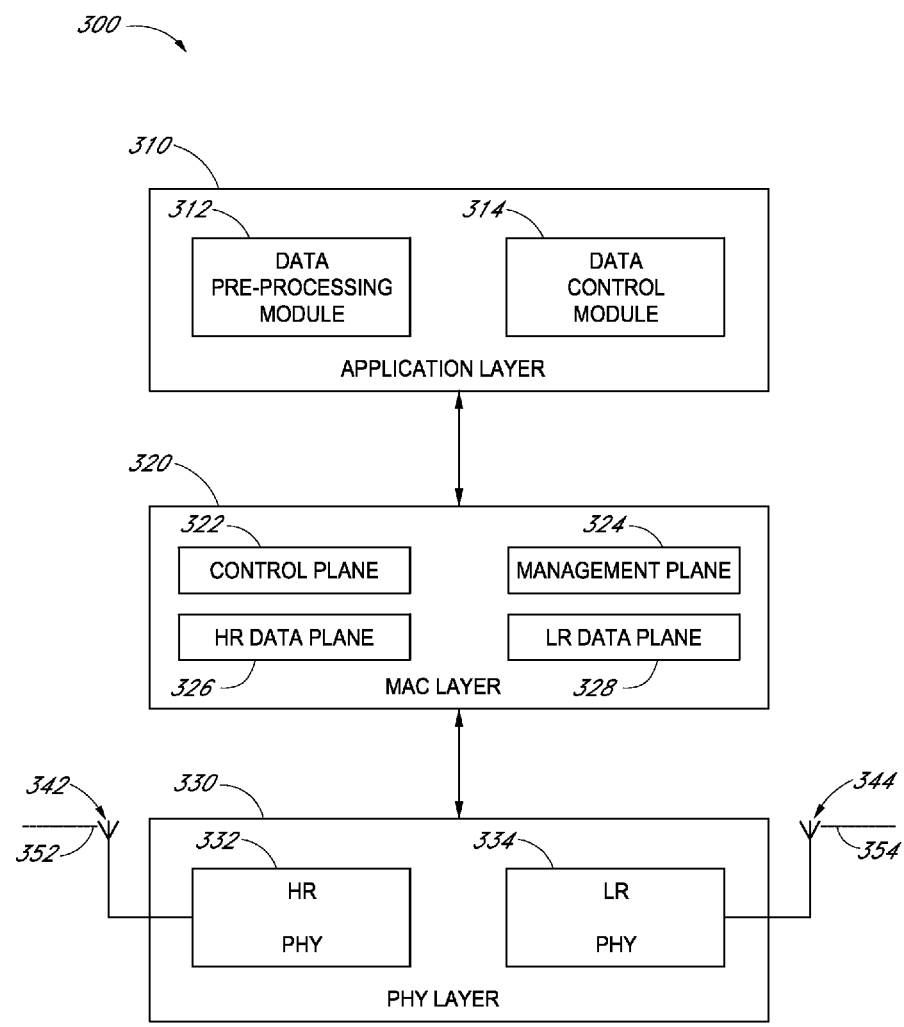
FIG. 3 is a block diagram illustrating a multi-band wireless device having high-rate and low-rate communication capabilities according to one embodiment.

Referring to FIG. 3, a multi-band wireless station that can communicate with one or more stations or access points via a high-rate channel and a low-rate channel according to one embodiment will be described below. The illustrated wireless station 300 may serve as a transmitter. The wireless station 300 can include an application layer 310, a medium access control (MAC) layer 320, and a physical (PHY) layer 330, and a first antenna system 342, and a second antenna system 344.

The application layer 310 may include a data pre-processing module 312 and a data control module 314. The data pre-processing module 312 can perform pre-processing of data, such as partitioning of data. The data control module 314 provides a standard way to exchange data handling information such as capability information. For example, before a connection begins, the data control module 314 negotiates the data formats to be used, and when the need for the connection is completed, data control commands are used to stop the connection.

The MAC layer 320 may include a control plane 322, a management plane 324, a high-rate data plane 326, and a low-rate data plane 328. The control plane 322 serves to control how the station 300 gains access to data and permission to transmit it over the network. In one embodiment, the control plane 322 can include a high-rate control plane and a low-rate control plane to provide access control over the high-rate channel and the low-rate channel, respectively. Further, the management plane 324 can include a high-rate management plane and a low-rate management plane to provide channel management over the high-rate channel and the low-rate channel, respectively.

The high-rate data plane 326 serves to process data from the application layer 310 to form packets suitable for high-rate transmission over a high-rate channel 352. The low-rate data plane 328 serves to process data from the application layer 310 to form packets suitable for low-rate transmission over a low-rate channel 354. In one embodiment, the high-rate data plane 326 may use the high-rate control plane and the high-rate management plane when transmitting data. The low-rate data plane 328 may use the low-rate control plane and the low-rate management plane when transmitting data. In other embodiments, the high rate data plane 326 and the low rate data plane 328 can use combined control and management planes.

The PHY layer 330 serves to further process the data and/or control packets from the MAC layer 320, and send them over wireless channels. The illustrated PHY layer 330 includes a high-rate (HR) PHY module 332 and a low-rate (LR) PHY module 334. The high-rate PHY module 332 adds PHY headers to data packets, and sends the packets over the high-rate channel 352 via the first antenna system 342. The first antenna system 342 may be capable of directional transmission and/or reception. The low-rate PHY module 332 adds PHY headers to control or data packets from the MAC layer 320, and sends the packets over the low-rate channel 354 via the second antenna system 344. The second antenna system may be capable of omni-directional and/or directional transmission and/or reception. In certain embodiments, the second antenna system 344 is configured to perform omni-directional transmission/reception as a default and to optionally provide directional transmission/reception.

Alternatively, the illustrated wireless station 300 may serve as a receiver. When serving as a receiver, the application layer 310, the MAC layer 320, and the PHY layer 330 of the station 300 can perform an inverse processing method of the layers 310-330 to regenerate data from data packets transmitted from another station over the wireless channels. A skilled technologist will appreciate that the configuration of the station can vary widely, depending on the design of the station as long as the station can send data and control information via a high rate channel and a low-rate channel, as described above.

Figure 4:
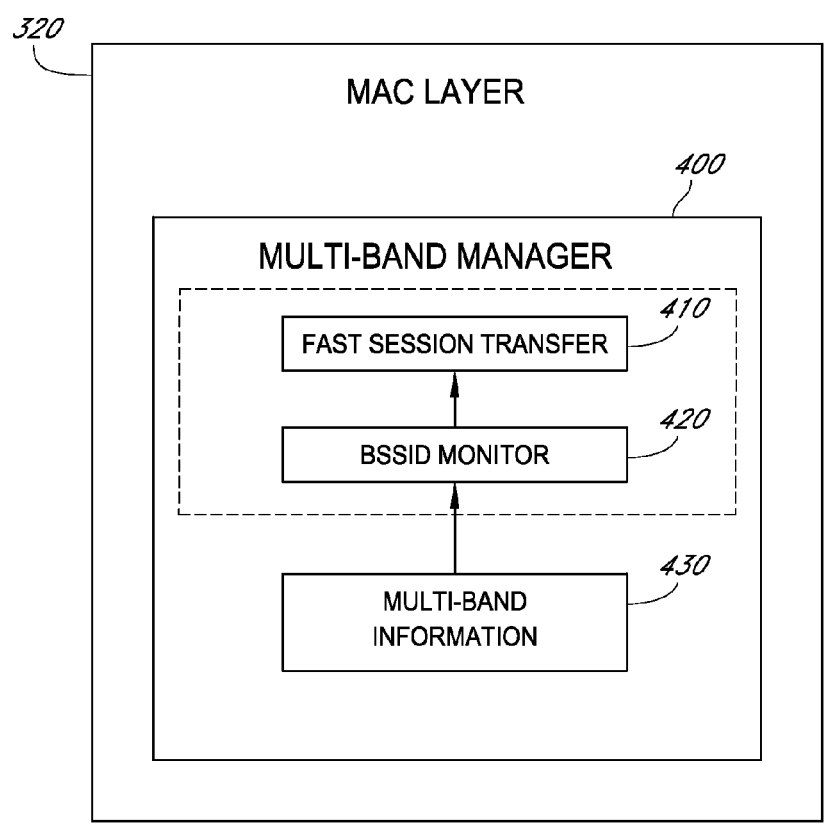
FIG. 4 is a block diagram illustrating the MAC layer of the wireless device of FIG. 3, including a multi-band manager according to one embodiment.

Referring to FIG. 4, the MAC layer of a multi-band wireless station (for example, the first and second stations 230, 240 of FIG. 2) according to one embodiment will be described below. The illustrated MAC layer 320 can also include a multi-band manager 400 in addition to one or more of the components 322, 324, 326, 328 of the MAC layer 320 of FIG. 3.

The multi-band manager 400 serves to manage use of multiple bands, based at least partly on multi-band information 430. The multi-band information 430 can be stored in a storage device (for example, a memory, a solid state disk, and/or a hard disk) of the multi-band station. At least part of the multi-band information 430 can be provided and updated by the multi-band station itself. In addition, at least part of the multi-band information 430 can be provided and updated by another wireless station or an access point.

In one embodiment, the multi-band information 430 can include a network identifier indicative of a network to which the multi-band station belongs. The multi-band information 430 can also include a network identifier provided by a peer (non-access point) wireless station. The peer station's network identifier can be indicative of a network to which the peer station belongs. Further, the multi-band information 430 can include the network identifiers of other networks that can cover the multi-band station, but are not currently associated with the multi-band station. In the illustrated embodiment where the multi-band station can use multiple bands, the multi-band information 430 can include one or more network identifiers for each of at least one of the multiple bands.

The multi-band manager 400 can keep track of the status of each of the multiple bands. In one embodiment, the multi-band manager 400 can keep track of the network identifier of the wireless station to which it belongs and its peer station on one or more of the multiple bands. The multi-band manager 400 can monitor if there is any change to its current network identifier(s) or if the multi-band station receives a new beacon signal having a different network identifier. In an instance where the wireless station is in an area covered by two or more overlapping basic service sets, the multi-band manager 400 can monitor any changes in its own network identifier, and determine which basic service set is suitable for communication, based on certain factors, such as signal quality, an effective data rate supported by the band, beam-forming data, and/or the maximum common modulation and coding sequence (MCS).

In another embodiment, the multi-band manager 400 can monitor the status of a peer-to-peer (P2P) link quality on one or more of multiple bands that the multi-band station can use. The multi-band manager 400 can consider a combination of various static and dynamic parameters of the multiple bands to determine which band is the most optimum for communication with other wireless stations. Examples of static and dynamic parameters include, but are not limited to, supported data rate, Bit Error Rate (BER), Signal to Interference and Noise Ratio (SINR), Received Signal Strength Indication (RSSI), energy cost Joules/bit, contention level, an effective contention free period available such as Transmit Opportunity (TXOP) in IEEE 802.11, coverage of peer-to-peer (P2P) stations, the optimum modulation and coding sequence (MCS) that decides the maximum possible data rate for a link, retransmission rate, application layer Quality of Service (QoS), and MAC layer queue length.

In the illustrated embodiment, the multi-band manager 400 can include a fast session transfer module 410 and a basic service set identifier (BSSID) monitor module 420. The BSSID module 420 can monitor the identifiers of one or more of basic service sets, based at least partly on the multi-band information 430, as described above. The BSSID module 420 can determine the availabilities of one or more of the multiple bands, based on the identifiers.

The fast session transfer module 410 can switch transmission between the multiple bands, based at least partly on the availability of the bands. For example, while the first station 230 (FIG. 2) is using the low-rate band in communication with the second station 240 (FIG. 2), the first station 230 can switch to the high-rate band if the high-rate band is available for communication with the second station 240. A skilled technologist will appreciate that the modules 410, 420 can be implemented using various software and/or hardware components, not limited to those shown in FIG. 4.

In one embodiment, the LR access point 215 of FIG. 2 can include an application layer, a MAC layer, and a PHY layer which are configured to process, send, and receive signals over the low-rate channel. Each of the HR access points 225a, 225b of FIG. 2 can include an application layer, a MAC layer, and a PHY layer which are configured to process, send, and receive signals over the high-rate channel. A skilled technologist will appreciate that various configurations of access points can be adapted for use as the LR access point 215 and the HR access points 225a, 225b.

Association and Maintenance in Multi-Band Wireless Network

A multi-band wireless system can include multi-band wireless stations, each of which can use multiple bands for wireless communication with another station. Because the multiple bands may have different characteristics (for example, their coverage and signal strength) from one another, the multi-band wireless stations may be in a situation to be able to use some of the multiple bands, but not other bands, for wireless communication at a given time.

In such an instance, the stations can be associated with each other via one of available bands, and use the band for communication between the stations. For example, the stations can be associated with each other over a low frequency band. In the context of this document, a band which multi-band stations are currently using for communication between them can be referred to as an "associated band." On the other hand, a band which multi-band stations are not currently using for communication between them can be referred to as an "unassociated band." It may be desirable to use an unassociated band (for example, a higher frequency band) for faster data transmission when the unassociated band becomes available. Thus, there is a need for keeping track of the status and/or availability of the multiple bands.

In one embodiment, two or more multi-band wireless stations can form a link or connection for communication on a first (associated) band of multiple bands. The multi-band wireless stations can exchange information on a second (unassociated) band on which no link is currently established between the stations. The exchange of the information can be performed on the first (associated) band. Based on the exchanged information, the stations can determine whether the second (unassociated) band is now available for data transmission between them, and can switch to the second (unassociated) band if the second band is available. In one embodiment, either the first band or the second band is active at a given time instance.

Figure 5A:
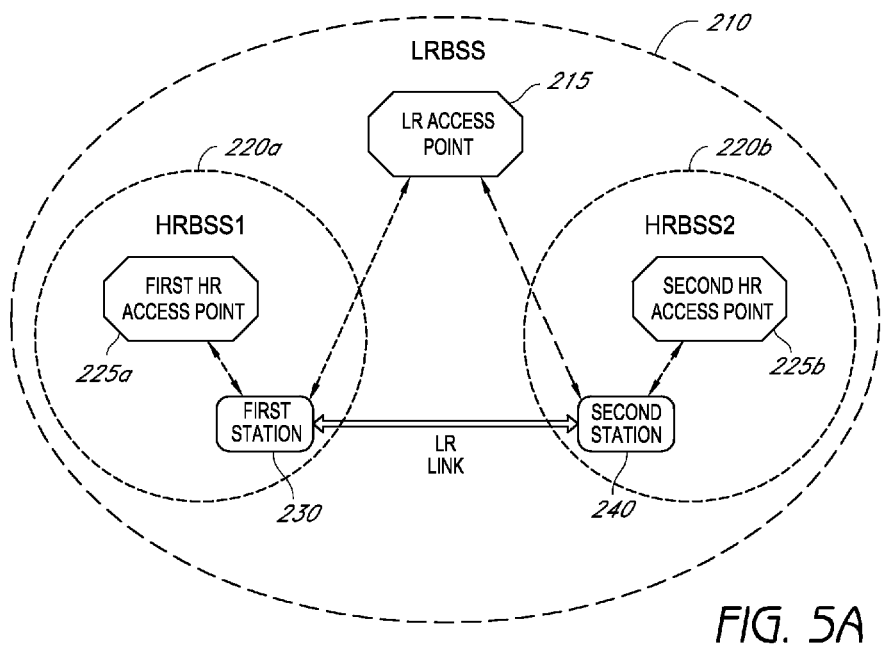
FIGS. 5A-5D illustrate a method of wireless communication by multi-band wireless devices according to one embodiment.

Referring to FIGS. 5A-5D, a method of wireless communication between multi-band stations in multi-band networks according to one embodiment will be described below. As shown in FIG. 5A, a first multi-band station 230 and a second multi-band station 240 are within the range of a low-rate network 210. Both of the first and second stations 230 have performed an association process with a low-rate (LR) access point 215, and are now connected to the LR access point 215 on a low-rate band (or channel). In the context of this document, such a network may also be referred to as a low-rate basic service set (LRBSS).

At the same time, the first station 230 is within the range of a first high-rate network 220a, and the second station 240 is within the range of a second high-rate network 220b. The first station 230 has performed an association process with a first high-rate (HR) access point 225a, and is now connected to the first HR access point 225a on a high-rate band (or channel). In the context of this document, such a network may also be referred to as a first high-rate basic service set (HRBSS1).

The second station 240 has performed an association process with a second high-rate (HR) access point 225b, and is now connected to the second HR access point 225b on the same high-rate band (or channel) as that of the first high-rate basic service set (HRBSS1). In the context of this document, such a network may also be referred to as a second high-rate basic service set (HRBSS2). Other details of the access points 215, 225a, 225b, and the stations 230, 240 can be as described above in connection with FIG. 2.

Because there is no overlap between the first and second high-rate networks 220a, 220b, the first and second stations 230, 240 cannot communicate with each other over the high-rate band. However, both the first and second stations 230, 240 are associated with the LR access point 215 on the low-rate band, and thus the first and second stations 230, 240 can establish a link on the low-rate band. The link may be, for example, a direct link specified under IEEE 802.11 standard. The term "direct link" refers to a bidirectional link from one non-access point (non-AP) quality of service (QoS) station to another non-AP QoS station operating in the same infrastructure QoS basic service set (BSS) that does not pass through a QoS access point. Once a direct link has been set up, all frames can be exchanged directly between the two non-AP QoS stations.

In the context of this document, a band which multi-band stations are currently using for communication between them can be referred to as an "associated band." For example, the low-rate band in FIG. 5A can be an associated band. On the other hand, a band which multi-band stations are not currently using for communication between them can be referred to as an "unassociated band." For example, the high-rate band in FIG. 5A can be an unassociated band for the case where the first station 230 and the second station 240 cannot communicate with each other using the high-rate band. A band may not be used for communication between multi-band stations for various reasons, including, but not limited to: an inferior link quality (for example, Bit Error Rate (BER), Signal to Interference and Noise Ratio (SINR), Received Signal Strength Indication (RSSI), and the like), a lower data rate, a lower effective available time due to a higher channel load, and distance separation.

In the illustrated embodiment, the first and second stations 230, 240 can exchange information on the status of the unassociated (high-rate) band over the associated (low-rate) band. In one embodiment, the information can include the network identifier or basic service set identifier (BSSID) of a network to which the station 230, 240 may belong. The BSSID can be, for example, 48-bit long, and can have the same format as an MAC address according to IEEE 802.11 standard.

For example, the first station 230 can provide the second station 240 with information on its unassociated band, including, for example, the network identifier of the first high-rate (HR) network 220a (or the BSSID of the first high-rate basic service set HRBSS1). Similarly, the second station 240 can provide the first station 230 with information on its unassociated band, including, for example, the network identifier of the second high-rate (HR) network 220a (or the BSSID of the second high-rate basic service set HRBSS2). Each of the network identifiers of the HR networks 220a or 220b can also be referred to as a private basic service set identifier (PB-SSID) in the context of this document.

The information on the status of the unassociated band can be included in a frame exchanged between the stations 230, 240. The frame can include a field indicative of the network identifier of the network using the unassociated band. The value of the field in an infrastructure basic service set (BSS) can be the MAC address currently in use by the station for indicating the access point of the BSS. Each of the first and second stations 230, 240 can keep track of its network identifier and the network identifier of the other station.

In one embodiment, the information on the status of the unassociated band can be periodically generated and transmitted on the low-rate (associated) band between the stations 230, 240. In another embodiment, the information on the status of the unassociated band can be generated and transmitted on the low-rate (associated) band by one of the stations 230, 240 upon a request by the other of the stations 230, 240.

In addition, the information on the status of the unassociated band can be generated and transmitted between the stations 230, 240 when there is a change in the status. In certain embodiments, the information on the status of the unassociated band can be generated and transmitted on the low-rate (associated) band between the stations 230, 240 only when there is a change in the status. In such embodiments, less power is consumed by the stations than when the status is periodically transmitted.

Figure 5B:
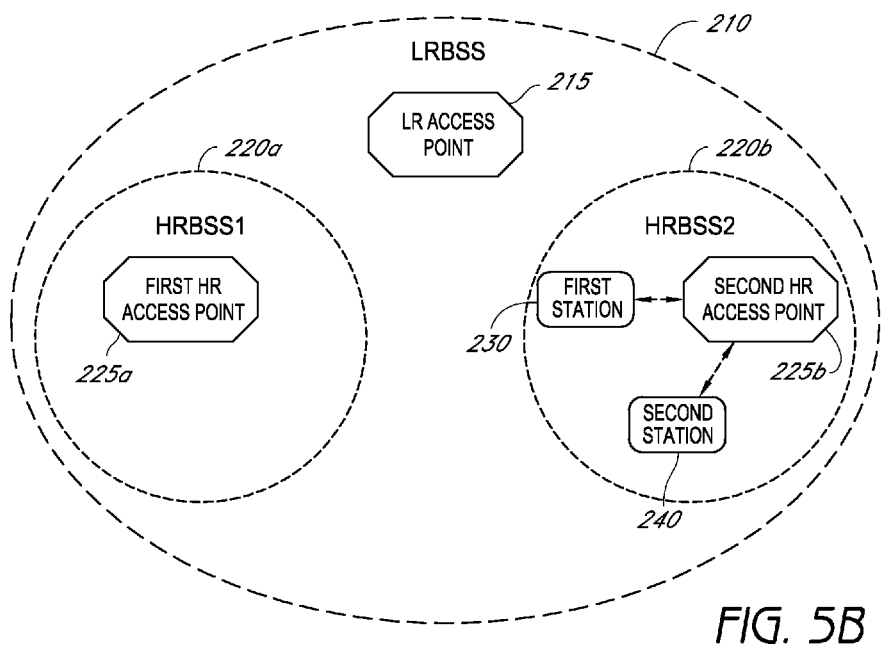

Referring to FIG. 5B, the first station 230 has moved closer to the second HR access point 225b such that the first station 230 is within the range of the second HR network 220b and is no longer within the range of the first HR network 220a. The first station 230 can now receive a beacon signal from the second HR access point 225b over the high-rate band, and can optionally perform an association process with the second HR access point 225b. The first station 230 can change its network identifier from the network identifier of the first HR network 220a to the network identifier of the second HR network 220b.

Figure 5C:
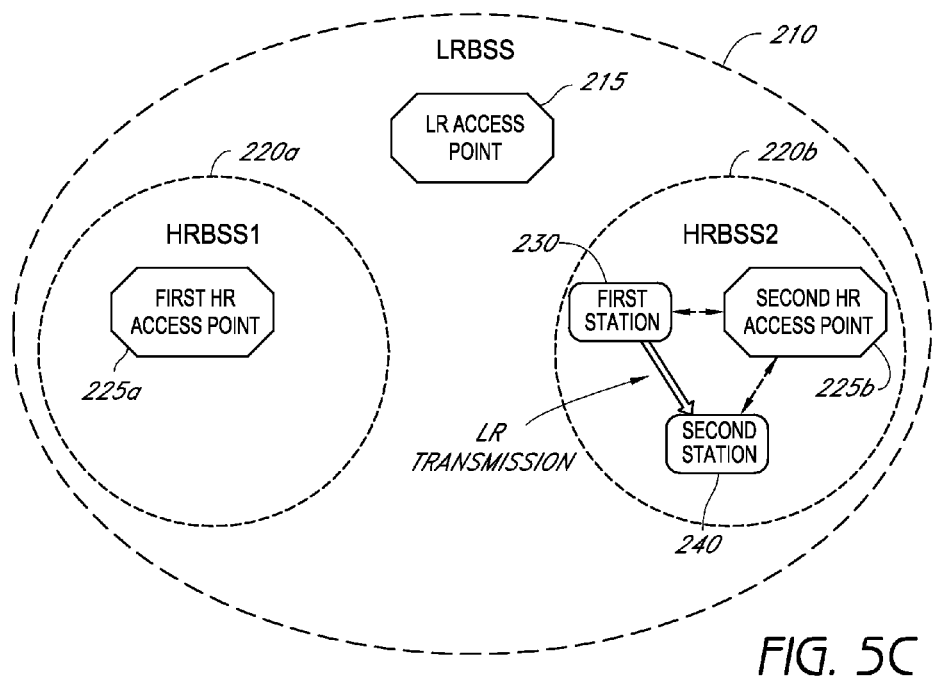

Referring to FIG. 5C, the first station 230 keeps track of its network identifier, and determines that there has been a change to the status of the high-rate (unassociated) band due to the change in its network identifier. The first station 230 can send the second station 240 information on the changed status of the high-rate (unassociated) band, using the low-rate (associated) band. In one embodiment, the first station 230 can send the information to the second station 240, using a direct link between them on the low-rate band. In another embodiment, the first station 230 can send the information to the second station 240 via the low-rate access point 215.

The second station 240 can also keep track of the network identifier of the first station and its own network identifier. Upon receiving the information from the first station 230, the second station 240 can determine if there has been a change to the status of the unassociated band, for example, if the network identifiers of the first and the second stations 230, 240 are the same as each other. The first and second stations 230, 240 are now within the same high-rate network 220b. In addition, both of the stations 230, 240 may be associated with the same high-rate access point 225b. Thus, the first and second stations 230, 240 may be within a range to communicate directly with each other on the high-rate band.

In view of the changed status of the high-rate band, either or both of the stations 230, 240 can determine if a session transfer from the low-rate band to the high-rate band can be triggered. The determination can be based at least partly on, for instance, whether the two stations are now reachable on the high-rate band and whether it may be more efficient to change the transmission channel. Efficiency of the transmission can be determined, based on various factors (for example, the beacon quality from the new unassociated BSS meets the acceptable SNR limit) by the multi-band manager. In one embodiment, this process can be performed at least partly by the multi-band manager of the station 230, 240, as shown in FIG. 4.

Figure 5D:
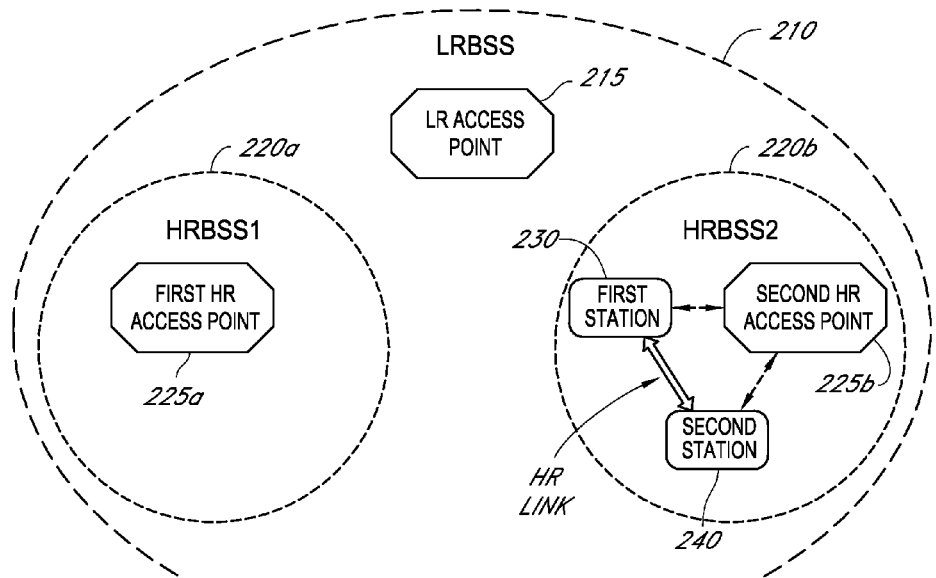

Referring to FIG. 5D, after having determined that the first and second stations 230, 240 can communicate with each other on the high-rate band, the first and second stations 230, 240 can attempt to set up a link (for example, a direct link) between them on the high-rate band (the unassociated band). Then, the first and second stations 230, 240 can use the link for data communication between them. In another embodiment where the first and second stations 230, 240 have completed an association process with the second high-rate access point 225b, the stations 230, 240 can communicate with each other on the high-rate band via the second high-rate access point 225b. In another instance, a change in the network identifier may indicate that the stations are no longer reachable on an associated band, for example, due to distance separation. In such an instance, the status of the associated band can be updated to be "unassociated."

Figure 6:
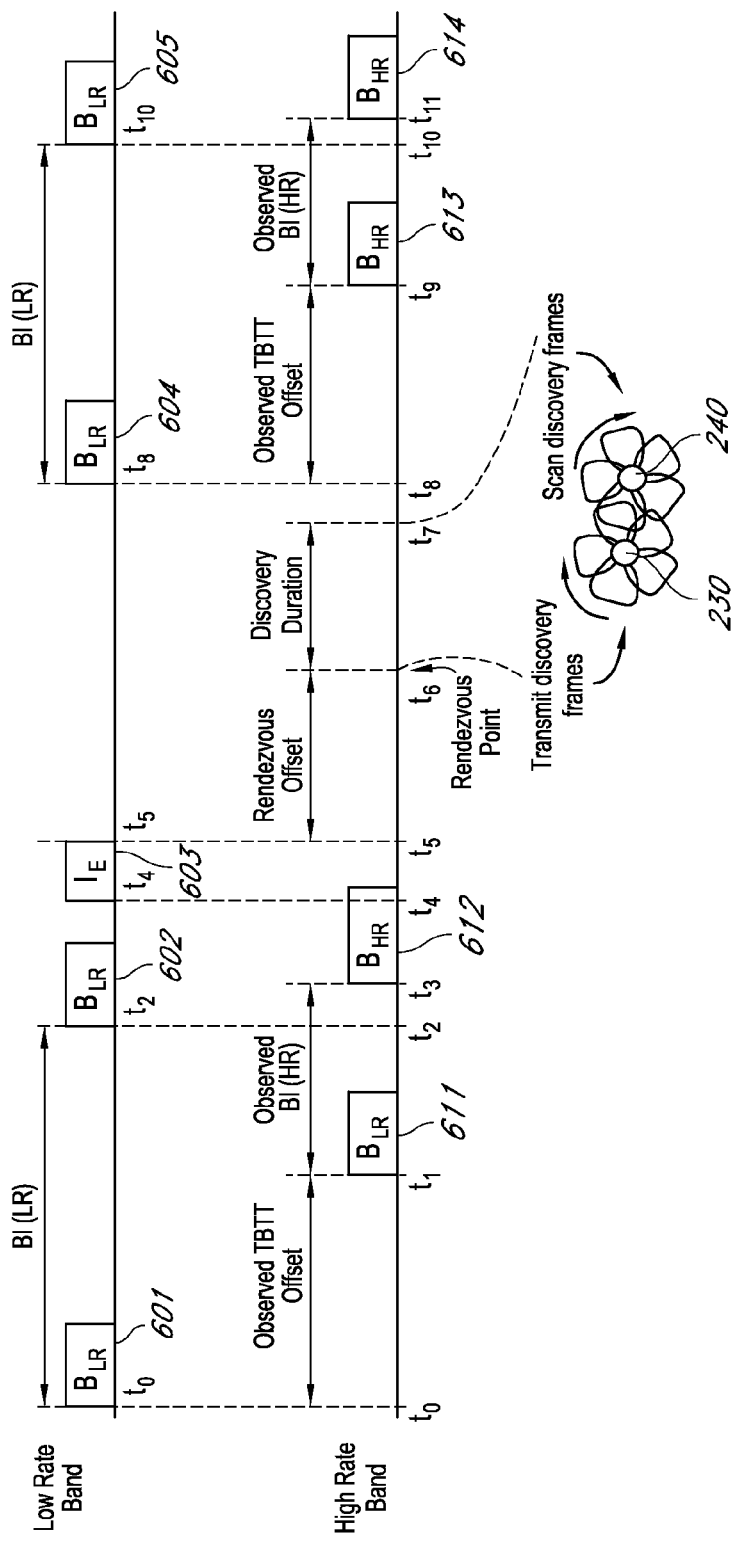
FIG. 6 is a timing diagram illustrating a method of wireless communication involving device discovery and association by multi-band wireless devices according to one embodiment.

Referring to FIGS. 5C, 5D, and 6, one embodiment of a method of changing transmission channel from one of multiple bands to another of the multiple bands will be described below. FIG. 6 is a timing diagram showing transmission of signals on a low-rate band and a high-rate band. A low-rate beacon interval starts at t0 and ends at t2. At t0, a first low-rate beacon signal 601 is transmitted on the low-rate band by the low-rate (LR) access point 215.

On the high-rate band, an observed target beacon transmission time (TBTT) offset, which indicates the TBTT offset between the start of a LR beacon and a HR beacon, starts at t0 and ends at t1 (between t0 and t2). In addition, an observed high-rate beacon interval starts at t1 and ends at t3 (after t2). At t1, a first high-rate beacon signal 611 is transmitted by the second HR access point 225b.

At t2, a second low-rate beacon signal 602 is transmitted from the LR access point 215 on the low-rate band. At t3 (after t2), a second high-rate beacon signal 612 is transmitted by the second HR access point 225b.

At t4 (after t3), a multi-band information element (IE) 603 is transmitted from the first station 230. The multi-band IE 603 can include information on the change of the status of the unassociated band, as will be described in more detail in connection with FIG. 7. The multi-band IE 603 can also include information on timing of a rendezvous offset period and a discovery duration which will be described below.

A rendezvous offset period starts at t5 and ends at t6. During the rendezvous offset period, the stations 230, 240 can switch its radio to the high-rate (unassociated) band to prepare for a discovery process on the high-rate band. In the illustrated embodiment, a single radio can be used at a given time instance.

At t6, the first and second stations 230, 240 can start a discovery process with each other. During a discover duration which starts at t6 and ends at t7, the first station 230 sends discovery frames sequentially to cover substantially all directions, using its directional beams over the high-rate band. During the discovery duration, the second station 240 scans discovery frames sequentially to cover substantially all directions, using its directional beams over the high-rate band.

If the discovery frames are successfully exchanged between the stations 230, 240, resulting in a successful discovery process, the first and second stations 230, 240 can now set up a link on the high-rate (unassociated) band, for example, a direct link, with each other, and can use the link for, for example, data transmission.

After the discovery duration, a third low-rate beacon signal 604 is transmitted at t8 on the low-rate band by the low-rate access point 215. A third high-rate beacon signal 613 is transmitted again at t9 on the high-rate band by the second high-rate access point 225b. A fourth low-rate beacon signal 605 is transmitted at t10 on the low-rate band by the low-rate access point 215. A fourth high-rate beacon signal 614 is transmitted again at t11 on the high-rate band by the second high-rate access point 225b.

Figure 7:
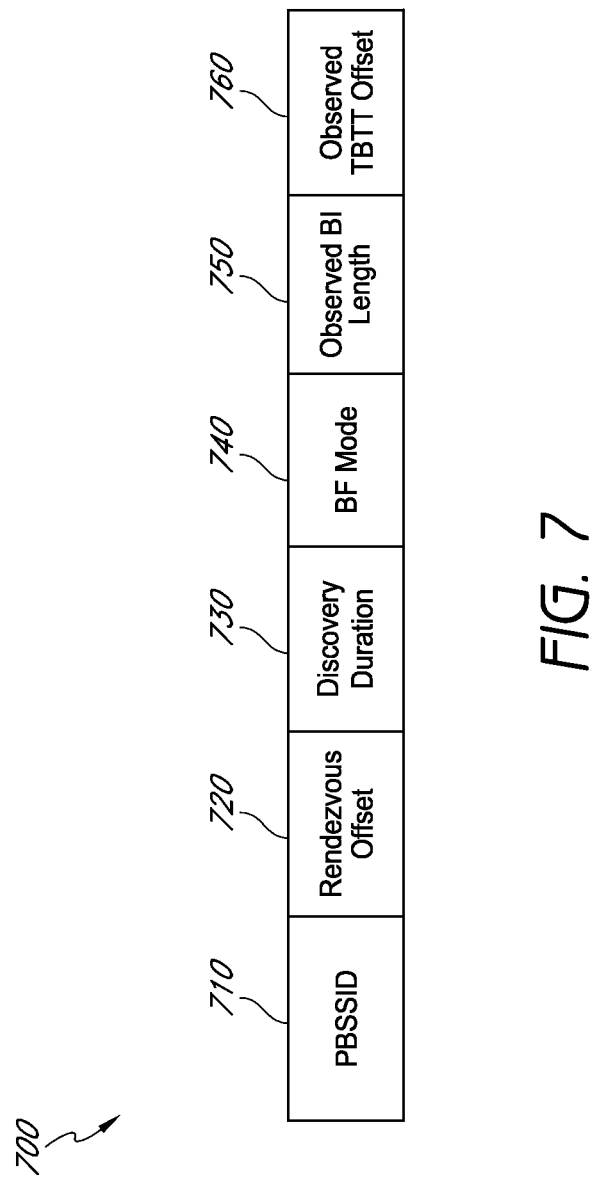
FIG. 7 is a frame format of an information element according to one embodiment.

Referring to FIG. 7, one embodiment of a frame format of a multi-band information element will be described below. The illustrated frame format 700 includes a personal basic service set identifier (PBSSID) field 710, a rendezvous offset field 720, a discovery duration field 730, a beamforming (BF) mode field 740, an observed beacon interval length field 750, and an observed target beacon transmission time (TBTT) offset field 760.

In one embodiment, the PBSSID field 710 can contain the MAC address of an access point (or a network identifier) on an unassociated band. The access point can be one with which a wireless station sending the IE 700 has been associated on the unassociated band. For example, in FIG. 5C, the second high-rate access point 225b can be an access point on an unassociated band. Thus, the first station 230 can send an information element including a PBSSID field 710 that contains the MAC address of the second high-rate access point 225b.

The rendezvous offset field 720 can be indicative of a time period, in microseconds, for the rendezvous offset (a time period between t5 and t6 in FIG. 6) on the low-rate band. The discovery duration field 730 can be indicative of a time period (a time period between t6 and t7 in FIG. 6), in microseconds, during which the station will remain for device discovery on the high-rate band after the rendezvous offset.

The BF mode field 740 can indicate a mode of the station on the high-rate band during the discovery duration. When set to one (1), the BF mode field 740 can indicate that the station shall be in the beam-former mode (e.g., initiating the directional discovery and transmitting discovery frames). When set to a different digit, the BF mode field 740 can indicate beam-formee mode (e.g., listening for discovery frames).

The observed beacon interval (BI) length field 750 can contain the length of the observed beacon interval on the high-rate (unassociated) band (for example, a time period between t1 and t3 in FIG. 6). The observed TBTT offset field 760 can contain a time period, in microseconds, between the target beacon transmission time (TBTT) on an associated band and an immediately following TBTT on an unassociated band (for example, a time period between t0 and t1 in FIG. 6). In some embodiments, the observed BI and TBTT for the high-rate band (for example, 60 GHz) can be estimated by a multi-band station that periodically switches to its high-rate radio to listen to beacon signals in its high-rate basic service set.

A skilled technologist will appreciate that one or more of the fields 710-760 of the frame format 700 can be omitted, and have a different order within the frame format 700. A skilled technologist will also appreciate that the frame format 700 can further include additional fields, depending on the needs.

The information provided by the information element frame 700 can significantly reduce energy spent in peer scanning by providing information for device discovery in advance. The information can also reduce latency in performing a multi-band transfer when the stations are reachable on the unassociated band.

Figure 8:
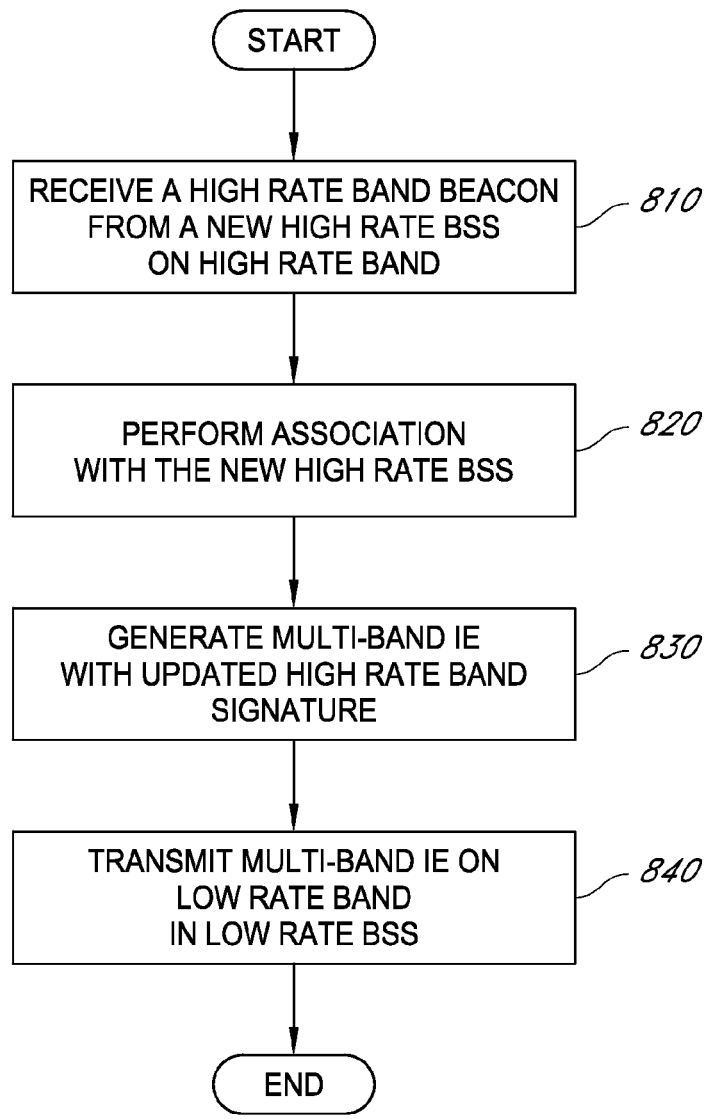
FIG. 8 is a flowchart illustrating a method of transmitting association information by a multi-band wireless device according to one embodiment.

Referring to FIG. 8, a process of wireless communication using a multi-band wireless station according to one embodiment described below. The illustrated process may occur at a station that moves from one high-rate basic service set (BSS) to another high-rate BSS (for example, the first station 230 of FIGS. 5A-5D).

At block 810 of FIG. 8, the station receives a high-rate band beacon from the other high-rate BSS (for example, the HRBSS2 of FIG. 5C) on the high-rate band. At block 820, the station can perform an association process with the other high-rate BSS. For example, the association process can be performed between the first station 230 and the second high-rate access point 225b in FIG. 5C.

At block 830, the station can generate a multi-band information element (IE) with the updated high-rate band information. For example, the station can generate an IE as shown in FIG. 7, and can include the network identifier of the other high-rate BSS (for example, the MAC address of the second high-rate access point 225b) in the PBSSID field 710 of the frame 700.

At block 840, the station can transmit the multi-band information element on the low-rate band to other stations in the low-rate basic service set. For example, the first station 230 can send the information element omni-directionally on the low-rate channel to the second station 240.

Figure 9:
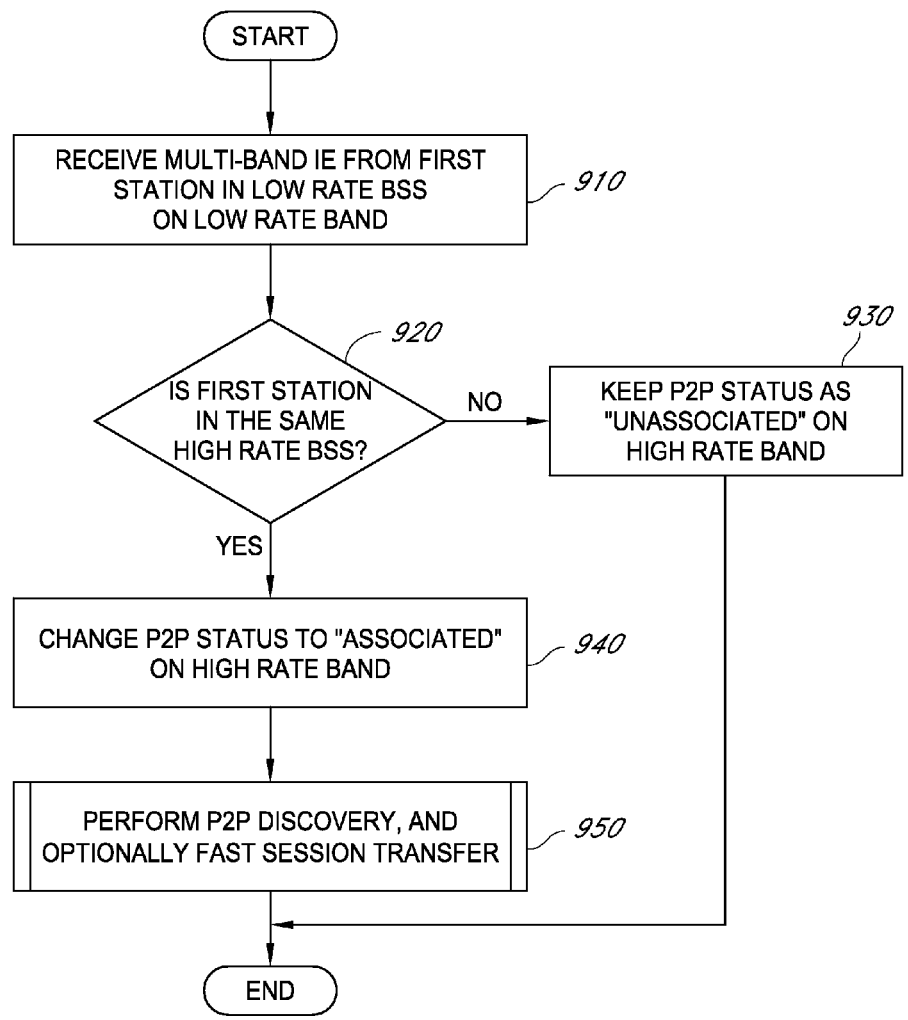
FIG. 9 is a flowchart illustrating a method of receiving and updating association information by a multi-band wireless device according to one embodiment.

Referring to FIG. 9, another process of wireless communication using a multi-band wireless station according to one embodiment described below. The illustrated process may occur at a station (for example, the second station 240 of FIGS. 5A-5D) that receives an information element from another station that has moved from one high-rate basic service set (BSS) to another high-rate BSS (for example, the first station 230 of FIGS. 5A-5D).

At block 910, the second station 240 receives a multi-band information element (IE) from the first station 230 in the same low-rate BSS on the low-rate (associated) band. At block 920, the second station 240 can determine whether the first station 230 is in the same high-rate BSS as the second station 240, based on the network identifier of the first station 230 contained in the information element and its own network identifier.

If "NO" at block 920, the process goes to block 930, where the second station 920 keeps the peer-to-peer station as "UNASSOCIATED" on the high-rate band. Then, the process is terminated. If "YES" at block 920, the process goes to block 940.

At block 940, the second station 240 can change the peer-to-peer status to "ASSOCIATED" on the high-rate band. At block 950, the second station 240 can perform a peer-to-peer discovery process during a time period specified by the information element. Optionally, the second station 240 can perform a session transfer to change its band to the high-rate band for data communication.

Figure 10:
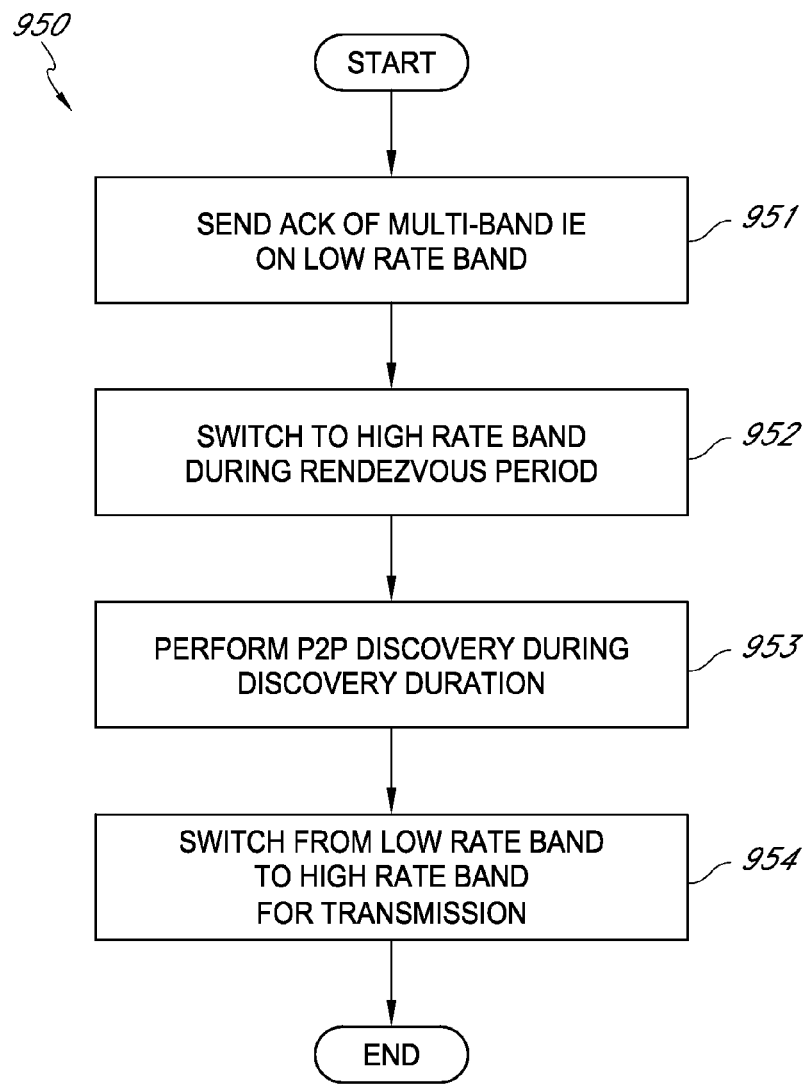
FIG. 10 is a flowchart illustrating one embodiment of the block of performing peer-to-peer discovery and fast session transfer of FIG. 9.

Referring to FIG. 10, a detailed process of block 940 of FIG. 9 according to one embodiment will be described below. At block 951, the second station 240 can optionally send an acknowledgment (ACK) signal of the multi-band information element over the low-rate band. At block 952, the second station can switch to the high-rate band during the rendezvous offset period specified by the information element.

At block 953, the second station 240 can perform a peer-to-peer discovery process with the first station 230 during the discovery duration specified by the information element.

During the discovery duration, the second station can take a suitable mode in view of the beamforming (BF) mode specified by the information element. For example, if the BF mode of the information element indicates that the first station 230 will be in a beam-former mode, the second station 240 can take a beam-formee mode to perform the discovery process with the first station 230. At block 954, the second station 240 can switch from the low-rate band to the high-rate band for data transmission with the first station 230.

In certain embodiments, after the first and second stations 230, 240 decide to transfer their current session from the low-rate band to the high-rate band, they may also inform other stations of the session transfer via a broadcast on the low-rate band. The multi-band managers of the stations 230, 240 can also update the status of the low and the high bands.

Figure 11:
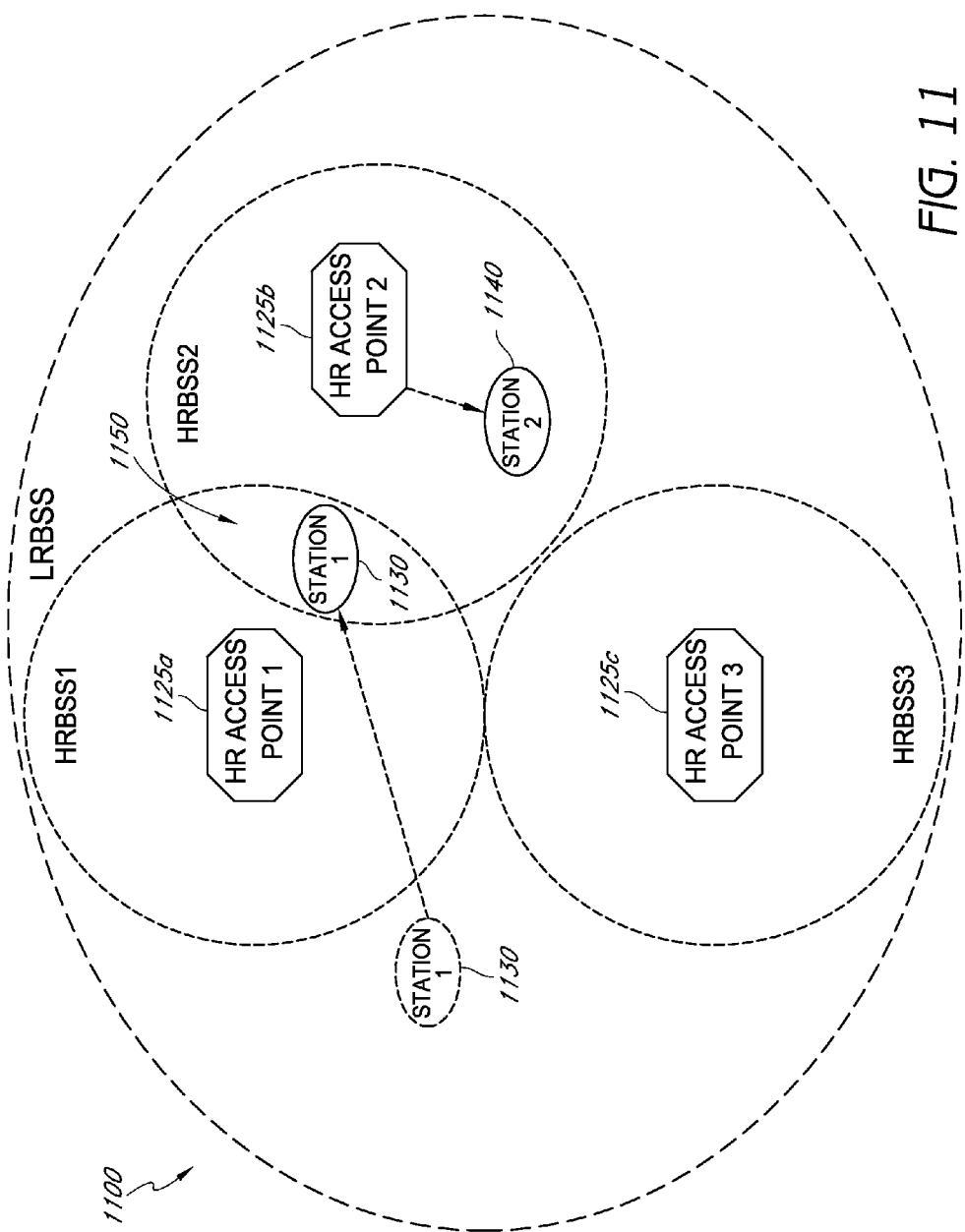
FIG. 11 is a block diagram illustrating a method of wireless communication by multi-band wireless devices according to another embodiment.

Referring to FIG. 11, a process of wireless communication between multi-band stations according to another embodiment will be described below. The illustrated system 1100 includes a low-rate basic service set LRBSS which overlaps with first to third high-rate basic service sets HRBSS1-HRBSS3. The first to third high-rate basic service sets HRBSS1-HRBSS3 include first to third high-rate access points 1125a-1125c, respectively. The system 1100 also includes a first multi-band station 1130 and a second multi-band station 1140 that are associated with each other on the low-rate band in the low-rate basic service set LRBSS2.

In the illustrated instance, the first high-rate basic service set HRBSS1 partially overlaps with the second high-rate basic service set HRBSS2 in a region indicated by 1150. At first, the first station 1130 can be outside the first to third high-rate basic service sets HRBSS1-HRBSS3, and the second station 1140 can be in the second high-rate basic service set HRBSS2.

Then, the first station 1130 can move into the region 1150, and can be within the coverage of both the first and second high-rate basic service sets HRBSS1 and HRBSS2. The first station 1130 can update its multi-band information with the network identifiers of the first and second high-rate basic service sets HRBSS1 and HRBSS2. The first station 1130 can also have the multi-band information of the second station 1140 that has been provided by the second station 1140 on the low-rate band.

The first station 1130 can determine which high-rate basic service set is suitable for communication with the second station 1140 on the high-rate band, based at least partly on the multi-band information of its own and the second station 1140. In the illustrated instance, the second high-rate basic service set HRBSS2 is more suitable for transmission with the second station 1140 than the first high-rate basic service set HRBSS1 in view of the fact that the second station 1140 is in the second high-rate basic service set HRBSS2.

Upon determining which high-rate basic service set is suitable for transmission on the high-rate band, the first station 1130 can generate and send a multi-band information element (IE) to the second station 1140 on the low-rate band. The multi-band information element can include the network identifier of the second high-rate basic service set in the PBSSID field thereof (FIG. 7). Upon receiving the information element, the second station 1140 can determine if both the first and second stations 1130, 1140 are within the same high-rate basic service set. If so, the second station 1140 can initiate a process for discovery and/or session transfer with the first station 1130, as shown in, for example, FIGS. 9 and 10.

Figure 12:
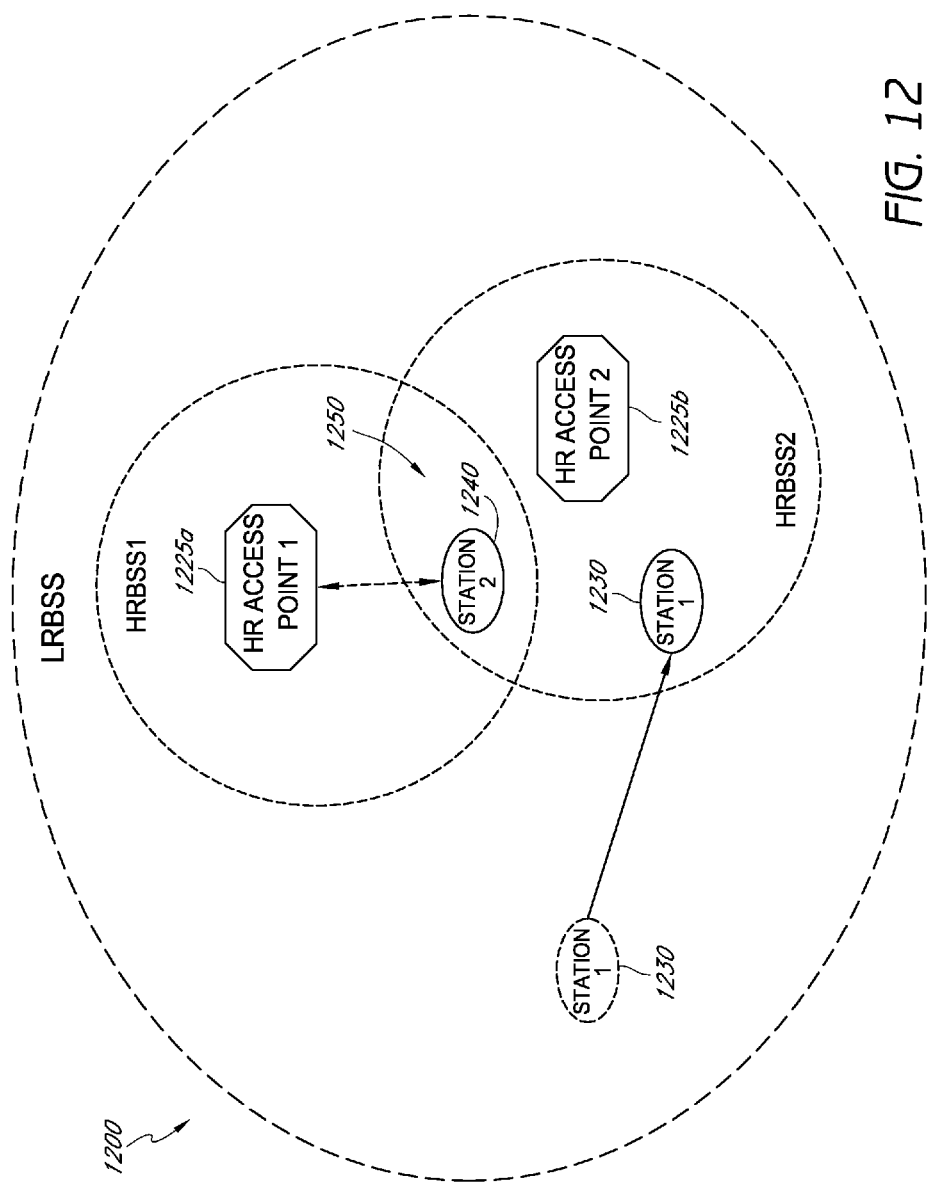
FIG. 12 is a block diagram illustrating a method of wireless communication by multi-band wireless devices according to yet another embodiment.

Referring to FIG. 12, a process of wireless communication between multi-band stations according to yet another embodiment will be described below. The illustrated system 1200 includes a low-rate basic service set LRBSS which overlaps with first and second high-rate basic service sets HRBSS1, HRBSS2. The first and second high-rate basic service sets HRBSS1-HRBSS2 include first and second high-rate access points 1225a, 1225b, respectively. The system 1200 also includes a first multi-band station 1230 and a second multi-band station 1240 that are associated with each other on the low-rate band in the low-rate basic service set LRBSS.

In the illustrated instance, the first high-rate basic service set HRBSS1 partially overlaps with the second high-rate basic service set HRBSS2 in a region indicated by 1250. At first, the first station 1230 can be outside the first and second high-rate basic service sets HRBSS1, HRBSS2. The second station 1240 can be in the region 1250 while being associated with the first high-rate access point 1225a in the first high-rate basic service set HRBSS1. The second station 1240 can keep the network identifier of the first high-rate basic service set HRBSS1 as its own network identifier in its multi-band information. Because the second station 1240 is within the coverage of the second high-rate basic service set HRBSS2, the second station 1240 can also keep the network identifier of the second high-rate basic service set HRBSS2 in its multi-band information.

Then, the first station 1230 can move into an area covered by the second high-rate basic service set HRBSS2, and can be associated with the second high-rate access point 1225b. The first station 1230 can update its multi-band information with the network identifier of the second high-rate basic service set HRBSS2. The first station 1230 can send the updated multi-band information to the second station 1240 on the low-rate band.

Upon receiving the updated multi-band information, the second station 1240 can determine which high-rate basic service set is suitable for communication with the first station 1240 on the high-rate band, based at least partly on the multi-band information of its own and the first station 1230. In the illustrated instance, the second high-rate basic service set HRBSS2 is more suitable than the first high-rate basic service set HRBSS1 for transmission with the first station 1230 in view of the fact that the first station 1230 is in the second high-rate basic service set HRBSS2. In certain embodiments, the second station 1230 can also take into account if the quality of a beacon signals from the second high-rate access point 1225b meets a selected Signal-to-Noise Ratio (SNR) limit.

Upon determining which high-rate basic service set is suitable for communication on the high-rate band, the second station 1240 can switch to the second high-rate basic service set HRBSS2 by associating with the second high-rate access point 1225b. Then, the second station 1240 can initiate a process for discovery and/or session transfer with the first station 1230, as shown in, for example, FIGS. 9 and 10.

In another embodiment, the first and second stations 1230, 1240 can communicate with each other on the low-rate band even if they belong to different high-rate basic service sets HRBSS1, HRBSS2. Thus, the first and second stations 1230, 1240 can discover each other via the multi-band information element exchanged therebetween. In such an embodiment, the first and second stations 1230, 1240 can have communication on the high-rate band after discovery without associating with the same high-rate access point.

In the methods of the embodiments described above in connection with FIGS. 8-12, one or more blocks or steps may be omitted. In addition, two or more of the blocks or steps may be combined together. A skilled technologist will also appreciate that the methods may include additional blocks or steps, depending on the needs.

In the embodiments described above, the multi-band wireless stations can exchange information on the status of an unassociated band over an associated band. This configuration allows the stations to quickly determine availability of the unassociated band, and to utilize the unassociated band effectively for communication between the stations. For example, if the unassociated band has a higher data transmission rate than the associated band, data can be transmitted at a higher rate by switching to the unassociated band. In addition, the information element exchanged between the stations allows an effective discovery between the stations.

The embodiments described above may be used for data (e.g., video data and audio data) streaming over a wireless network. For example, the embodiments may be adapted for transmission of uncompressed video in a wireless local area network (WLAN) under the IEEE 802.11 standard (for example, IEEE 802.11ad). The embodiments can also be adapted for a wireless system having a very high throughput (VHT) of about 0.5 Gbps to about 4 Gbps. For example, the embodiments can be adapted for a standard such as the WiGig standard. In other arrangements, the embodiments can be adapted for a wireless system having a bandwidth of 60 GHz, while supporting the IEEE 802.11 standard.

While the above detailed description has shown, described, and pointed out the fundamental novel features of the invention as applied to various embodiments, it will be understood that various omissions and substitutions and changes in the form and details of the system illustrated may be made by those skilled in the art, without departing from the intent of the invention.

What is claimed is:

1. A wireless device for wireless communication, the wireless device comprising:
a first antenna system configured to use a first frequency band for wireless communication;
a second antenna system configured to use a second frequency band for wireless communication, the second frequency band being different from the first frequency band;
a memory configured to store multi-band information comprising a status of the second frequency band, wherein the multi-band information comprises a first network identifier of a first wireless network and a second identifier of a second wireless network; and
a medium access control (MAC) layer configured to monitor the status of the second frequency band, and to communicate a signal to another wireless device via a pre-established wireless link on the first frequency band, the signal including at least part of the multi-band information, wherein communication between the wireless device and the other wireless device on the first frequency band is changed to the second frequency band based on a determination using the first identifier and the second identifier, wherein the signal comprises an information element frame for providing device discovery information including one of the first identifier and the second identifier for use in a discovery process in advance of the discovery process between the wireless device and the other wireless device.

2. The wireless device of claim 1, wherein the first frequency band has a lower frequency than the second frequency band, and wherein the first frequency band has a longer range of transmission than the second frequency band.

3. The wireless device of claim 2, wherein the first frequency band has a frequency of about 2.4 or 5 GHz, and wherein the second frequency band has a frequency of about 60 GHz.

4. The wireless device of claim 2, wherein the first antenna system is configured to use the first frequency band for wireless communication in a first wireless network, and wherein the second antenna system is configured to use the second frequency band for wireless communication in a second wireless network different from the first wireless network.

5. The wireless device of claim 4, wherein the MAC layer is configured to transmit the signal if there is a change to the network identifier of the second wireless network.

6. The wireless device of claim 4, wherein the MAC layer is configured to transmit the signal if the device receives a network identifier from a third wireless network that uses the second frequency band, the third wireless network being different from the first and second wireless networks.

7. The wireless device of claim 4, wherein the MAC layer is configured to transmit the signal periodically.

8. The wireless device of claim 4, wherein the MAC layer is configured to receive a signal from the other wireless device via the pre-established wireless link on the first frequency band, the signal including a network identifier of a third wireless network that uses the second frequency band, and covers the other wireless device.

9. The wireless device of claim 8, wherein the MAC layer is further configured to determine if the network identifier of the second wireless network is the same as the network identifier of the third wireless network.

10. The wireless device of claim 9, wherein the MAC layer is further configured to communicate with the other wireless device via the second frequency band if the network identifier of the second wireless network is the same as the network identifier of the third wireless network.

11. The wireless device of claim 4, wherein the network identifier of the second wireless network comprises a MAC address of the second access point.

12. The wireless device of claim 1, wherein the information element frame comprises a network identifier field indicative of one or more networks using the second frequency band, a rendezvous offset field, a discovery duration field, a beamforming mode field, an observed beacon interval field, and an observed target beacon transmission time offset field.

13. The wireless device of claim 1, wherein the first frequency band is a frequency band on which a peer-to-peer communication link has been established by an association process with another wireless device.

14. The wireless device of claim 1, wherein the second frequency band is a frequency band on which a peer-to-peer communication link has not been established by an association process with another wireless device.

15. The wireless device of claim 1, wherein either the first frequency band or the second frequency band is active at a given time instance.

16. A wireless communication system, the system comprising:
a first multi-band wireless station that is capable of using a first frequency band and a second frequency band for wireless communication, the second frequency band being different from the first frequency band; and
a second multi-band wireless station that is capable of using the first frequency band and the second frequency band for wireless communication, wherein one or more of the first multi-band wireless station and the second multi-band wireless station is configured to store multi-band information comprising a status of the second frequency band, wherein one or more of the first multi-band wireless station and the second multi-band wireless station is further configured to monitor the status of the second frequency band, the status comprising availability of the second frequency band for communication between the first multi-band wireless station and the second multi-band wireless station, wherein the monitored status comprises a network identifier of a wireless network covering one or more of the first multi-band wireless station and the second multi-band wireless station on the second frequency band, and wherein the first multi-band wireless station and the second multi-band wireless station share the monitored status of service sets with each other via the first frequency band, wherein communication between the first multi-band wireless station and the second multi-band wireless station using the first frequency band is changed to the second frequency band based on a determination using the network identifier, wherein the first multi-band wireless station and the second multi-band wireless station communicate with a signal on the first frequency band that comprises an information element frame for providing device discovery information for use in a discovery scanning process in advance of the discovery scanning process performed between the first multi-band wireless station and the second multi-band wireless station.

17. The system of claim 16, wherein the first frequency band has a lower frequency than the second frequency band, and wherein the first frequency band has a longer range of transmission than the second frequency band.

18. The system of claim 16, wherein the first multi-band wireless station and the second multi-band wireless station are each configured to establish a link therebetween on the first frequency band before sharing the monitored status.

19. The system of claim 18, further comprising: a first access point configured to be associated with the first multi-band wireless station and the second multi-band wireless station via the first frequency band; and a second access point configured to be associated with one or more of the first multi-band wireless station and the second multi-band wireless station via the second frequency band.

20. The system of claim 19, wherein one or more of the first multi-band wireless station and the second multi-band wireless station is further configured to transmit a frame containing the network identifier via the first frequency band if there is a change to the network identifier.

21. The system of claim 19, wherein one or more of the first multi-band wireless station and the second multi-band wireless station is further configured to determine if a network covering the first station is the same as a network covering the second station, based at least partly on the network identifier.

22. The system of claim 21, wherein the first multi-band wireless station and the second multi-band wireless station are further configured to communicate with each other via the second frequency band if the network covering the first station is the same as the network covering the second station.

23. The system of claim 19, wherein one or more of the first multi-band wireless station and the second multi-band wireless station is further configured to identify the network identifier from a beacon signal transmitted on the second frequency band from the second access point.

24. The system of claim 23, wherein one or more of the first multi-band wireless station and the second multi-band wireless station is further configured to monitor a status of the beacon signal, and to determine whether to use the second frequency band for wireless communication, based at least partly on the monitored status of the beacon signal.

25. The system of claim 16, wherein the first frequency band is a frequency band on which a peer-to-peer communication link has been established by an association process between the first multi-band wireless station and the second multi-band wireless station.

26. The system of claim 16, wherein the second frequency band is a frequency band on which a peer-to-peer communication link has not been established by an association process between the first multi-band wireless station and the second multi-band wireless station.

27. A method of wireless communication, the method comprising:
establishing, by a first multi-band wireless station capable of using first and second frequency bands for wireless communication, a wireless link on the first frequency band with a second multi-band wireless station capable of using the first and second frequency bands for wireless communication, the second frequency band being different from the first frequency band;
monitoring, by the first multi-band wireless station, a status of the second frequency band, wherein the status of the second frequency band comprises an identifier of a basic service set covering the first multi-band wireless station on the second frequency band;
transmitting, by the first multi-band wireless station, an information element containing the status of the second frequency band to the second multi-band wireless station via the first frequency band; and
determining to transfer a session from the first frequency band to the second frequency band for the first multi-band wireless station and the second multi-band wireless station based on a determination using the identifier of the basic service set that provides an indication of availability for communication between the first multi-band wireless station and the second multi-band wireless station to communicate using the second frequency band,
wherein the information element comprises a frame for providing device discovery information for use in a discovery process in advance of performing the discovery process between the first multi-band wireless station and the second multi-band wireless station.

28. The method of claim 27, wherein monitoring the status of the second frequency band comprises receiving a beacon from an access point via the second frequency band.

29. The method of claim 28, further comprising performing an association process with the access point.

30. The method of claim 29, wherein transmitting the information element comprises transmitting the information element if there is a change to the identifier.

31. The method of claim 29, further comprising: receiving, by the first multi-band wireless station via the first frequency band, an identifier of a basic service set covering the second multi-band wireless station on the second frequency band.

32. The method of claim 31, further comprising determining, by the first multi-band wireless station, whether the identifier of the basic service set covering the first station is the same as the identifier of the basic service set covering the second multi-band wireless station.

33. The method of claim 31, further comprising transmitting data to the second multi-band wireless station via the second frequency band if the identifier of the basic service set covering the first multi-band wireless station is the same as the identifier of the basic service set covering the second multi-band wireless station.

34. The method of claim 31, wherein the first multi-band wireless station has identifiers of two or more basic service sets covering the first multi-band wireless station, and wherein the method further comprises determining, by the first multi-band wireless station, which of the two or more basic service sets is the same as the basic service set covering the second multi-band wireless station.

35. The method of claim 27, wherein the information element further contains information for a device discovery between the first multi-band wireless station and the second multi-band wireless station.

36. The method of claim 27, wherein the information element further contains information on beacon signal transmissions on the second frequency band.

37. A method of wireless communication, the method comprising:
establishing, by a first multi-band wireless station capable of using first and second frequency bands for wireless communication, a wireless link on the first frequency band with a second multi-band wireless station capable of using the first and second frequency bands for wireless communication, the second frequency band being different from the first frequency band;
receiving, by the first multi-band wireless station, a signal including information on a status of the second frequency band from the second multi-band wireless station via the wireless link on the first frequency band, wherein the status of the second frequency band comprises an identifier of a basic service set covering the second multi-band wireless station on the second frequency band;
determining, by the first station, whether the second frequency band is available for switching frequency band for communication between the first multi-band wireless station and the second multi-band wireless station based on the signal,
wherein the signal comprises a frame for providing device discovery information for use in a discovery process in advance of performing the discovery process between the first multi-band wireless station and the second multi-band wireless station.

38. The method of claim 37, further comprising determining, by the first multi-band wireless station, whether the identifier of the basic service set covering the first multi-band wireless station is the same as the identifier of the basic service set covering the second multi-band wireless station.

39. The method of claim 38, further comprising updating the status of the second frequency band, based at least partly on the information included in the received signal.

40. The method of claim 39, further comprising: performing a scanning discovery process on the second frequency band between the first multi-band wireless station and the second multi-band wireless station; and communicating data via the second frequency band between the first multi-band wireless station and the second multi-band wireless station, wherein the second multi-band wireless station scans discovery frames over the second frequency band.

41. The method of claim 40, wherein performing the scanning discovery process comprises: transmitting, by the first multi-band wireless station, an acknowledgment signal of the signal via the first frequency band; switching, by the first multi-band wireless station and the second multi-band wireless station, to the second frequency band during a pre-scheduled time period; and performing the scanning discovery process during the pre-scheduled time period.

42. The method of claim 37, further comprising:
obtaining, by the first multi-band wireless station, identifiers of two or more basic service sets that cover the first multi-band wireless station;
determining, by the first multi-band wireless station, which of the two or more basic service sets is the same as the basic service set covering the second multi-band wireless station; and
associating, by the first multi-band wireless station, with an access point of the basic service set covering the second multi-band wireless station.

43. The method of claim 37, further comprising:
determining, by the first multi-band wireless station, whether the first multi-band wireless station and the second multi-band wireless station are within the coverage of the same basic service set on the second frequency band; and
communicating, by the first multi-band wireless station, with the second multi-band wireless station without associating with a second frequency band access point with which the second multi-band wireless station has been associated, and without performing the discovery process that includes the first station transmitting discovery frames and the second station scanning for the discovery frames.

44. The method of claim 27, wherein the first multi-band wireless station provides the second multi-band wireless station with information on an unassociated band of the first multi-band wireless station based on an identifier for a first high-rate basic service set.

45. The method of claim 44, wherein the second multi-band wireless station provides the first multi-band wireless station with information on an unassociated band of the second multi-band wireless station based on an identifier for a second high-rate basic service set.

46. The method of claim 45, further comprising: changing identifiers by the first multi-band wireless station based on reduced distance from the first multi-band wireless station to another access point.

47. The wireless device of claim 1, wherein the first identifier indicative of a first wireless network that the wireless device belongs to and the second identifier indicative of the second wireless network that a peer wireless device belongs to.

48. The wireless device of claim 47, further comprising monitoring the first and second identifiers for changes to the first identifier or the second identifier based on movement of the wireless device.

49. The wireless device of claim 48, further comprising monitoring changes of a network identifier of a multiband manager of the MAC layer for determining a basic service set to use for communication based on multiple factors.

50. The wireless device of claim 49, wherein the multiple factors comprise one or more of signal quality, effective data rate supported by a band, beam-forming data and maximum common modulation and coding sequence (MCS).

51. The wireless device of claim 1, wherein the signal contains a network identifier field comprising a personal basic service set identifier field and a beamforming mode field.

52. The wireless device of claim 51, wherein the beamforming mode field indicates a beam-former mode or a beam-formed mode for the wireless device on the second frequency band during a discovery duration.

53. The wireless device of claim 52, wherein the beam-former mode comprises the device initiating directional discovery and transmitting discovery frames, and the beamformed mode comprises the device listening for discovery frames.

54. The wireless device of claim 1, wherein the information element frame provides device discovery information for communication on the second frequency band after exchange of the discovery information without associating and without performing the discovery process between the wireless device and the other wireless device comprising scanning discovery frames.

55. The wireless device of claim 1, wherein the wireless device determines a particular network identifier to transmit to the other wireless device in the information element based on determining a particular network available for the wireless device and the other wireless device to communicate using the second frequency band.

56. The method of claim 37, wherein the frame for providing device discovery information is communicated prior to association of both of the first multi-band wireless station and the second multi-band wireless station with the second frequency band.

57. The wireless device of claim 1, wherein the determination using the first identifier and the second identifier comprises determining whether the wireless device and the other wireless device are in a same high-rate basic service set based on the first identifier and the second identifier.

58. The wireless device of claim 57, wherein for the wireless device and the other wireless device being in the same high-rate basic service set, the determination changes a peer-to-peer status for the wireless device and the other wireless device to an associated peer-to-peer status on the second frequency band.

* * * * *